US012443952B2

(12) United States Patent
Sathyan et al.

(10) Patent No.: US 12,443,952 B2
(45) Date of Patent: Oct. 14, 2025

(54) MANAGEMENT PLATFORM FOR COMMUNITY ASSOCIATION MGCOne ONLINE PLATFORM AND MARKETPLACE

(71) Applicants: Savitha Sathyan, Chicago, IL (US); Jeyaranjan Sankarasivam, Chicago, IL (US)

(72) Inventors: Savitha Sathyan, Chicago, IL (US); Jeyaranjan Sankarasivam, Chicago, IL (US)

( * ) Notice: Subject to any disclaimer, the term of this patent is extended or adjusted under 35 U.S.C. 154(b) by 240 days.

(21) Appl. No.: 18/072,887

(22) Filed: Dec. 1, 2022

(65) Prior Publication Data
US 2023/0245189 A1    Aug. 3, 2023

Related U.S. Application Data

(60) Provisional application No. 63/304,062, filed on Jan. 28, 2022.

(51) Int. Cl.
*G06Q 20/38*     (2012.01)
*G06Q 10/0631*   (2023.01)
(Continued)

(52) U.S. Cl.
CPC ... *G06Q 20/389* (2013.01); *G06Q 10/063112* (2013.01); *G06Q 20/3821* (2013.01);
(Continued)

(58) Field of Classification Search
None
See application file for complete search history.

(56) References Cited

U.S. PATENT DOCUMENTS

| 7,769,604 B1 * | 8/2010 | Lefco | G06Q 10/10 705/2 |
| 11,601,498 B2 * | 3/2023 | Jayaram | G06Q 20/02 |

(Continued)

FOREIGN PATENT DOCUMENTS

| BR | 102021019962 A2 * | 4/2023 | |
| CA | 3139505 A1 * | 11/2020 | G06F 11/3409 |

(Continued)

OTHER PUBLICATIONS

Rahman et al. Scalable Role-based Access Control Using The EOS Blockchain. Cornell University. https://arxiv.org/abs/2007.02163 (Year: 2007).*

(Continued)

*Primary Examiner* — El Mehdi Oussir
(74) *Attorney, Agent, or Firm* — The Rapacke Law Group, P.A.

(57) ABSTRACT

A system for a community association management platform and marketplace including: a processing component of a management server node connected to a plurality of entities over a blockchain network of an association management platform and marketplace and a memory component on which are stored machine-readable instructions that when executed by the processing component, cause the processing component to: receive an onboarding request from an entity off chain; parse the onboarding request to derive a role of the entity; broadcast the onboarding request and the role to a plurality of minimum required entities on the blockchain network; responsive to receiving an onboarding consensus from the plurality of minimum required entities, onboard the entity onto the association management platform and/or marketplace; establish digital identity and login credentials for the entity; determine a role of the entity based on the (Continued)

credentials; and enable a UI portal for the entity based on the role.

16 Claims, 22 Drawing Sheets

(51) Int. Cl.
*G06Q 20/40* (2012.01)
*G06Q 30/0601* (2023.01)
(52) U.S. Cl.
CPC ..... *G06Q 20/4014* (2013.01); *G06Q 30/0609* (2013.01); *G06Q 2220/00* (2013.01)

(56) References Cited

U.S. PATENT DOCUMENTS

| | | | | |
|---|---|---|---|---|
| 11,848,758 | B1* | 12/2023 | Dods | G06N 3/045 |
| 11,989,269 | B1* | 5/2024 | Goeringer | H04L 9/3263 |
| 12,079,283 | B2* | 9/2024 | Yu | H04L 9/3247 |
| 2009/0254392 | A1* | 10/2009 | Zander | H04L 41/22 |
| | | | | 705/50 |
| 2015/0200950 | A1* | 7/2015 | Meunier | G06Q 20/40 |
| | | | | 726/4 |
| 2016/0012465 | A1* | 1/2016 | Sharp | G06Q 20/321 |
| | | | | 705/14.17 |
| 2016/0260081 | A1* | 9/2016 | Zermeño | G06Q 20/4014 |
| 2017/0140386 | A1* | 5/2017 | Kolkowitz | G06Q 50/01 |
| 2018/0137512 | A1* | 5/2018 | Georgiadis | H04L 63/08 |
| 2018/0225194 | A1* | 8/2018 | Saleh-Esa | G06F 11/3698 |
| 2018/0268401 | A1* | 9/2018 | Ortiz | G06Q 20/326 |
| 2018/0335935 | A1* | 11/2018 | Larson | G06F 3/04842 |
| 2019/0205552 | A1* | 7/2019 | Espinosa | H04L 9/0637 |
| 2019/0228385 | A1* | 7/2019 | Jayaram | G06Q 40/04 |
| 2020/0007311 | A1* | 1/2020 | Oberhofer | H04L 63/102 |
| 2020/0013046 | A1* | 1/2020 | Joao | G06Q 20/02 |
| 2020/0074059 | A1* | 3/2020 | Beckett, Jr. | G06F 21/36 |
| 2020/0117690 | A1* | 4/2020 | Tran | G06Q 20/18 |
| 2020/0177386 | A1* | 6/2020 | Mahmood | H04L 63/102 |
| 2020/0184548 | A1* | 6/2020 | Rao | G06Q 30/0645 |
| 2020/0265433 | A1* | 8/2020 | Perezleon | G06Q 20/3226 |
| 2020/0344233 | A1* | 10/2020 | Lai | G06Q 20/4014 |
| 2021/0012605 | A1* | 1/2021 | Yamine | B65F 1/1484 |
| 2021/0042738 | A1* | 2/2021 | Edwards | G06Q 20/38 |
| 2021/0176638 | A1* | 6/2021 | Heldt-Sheller | H04W 12/06 |
| 2021/0234849 | A1* | 7/2021 | Lamb | H04L 63/04 |
| 2021/0295336 | A1* | 9/2021 | Perezleon | G06Q 20/3278 |
| 2022/0021528 | A1* | 1/2022 | Dawson, III | H04L 9/3236 |
| 2022/0150072 | A1* | 5/2022 | Jacob | H04L 63/123 |
| 2022/0191186 | A1* | 6/2022 | Chandramohan | H04L 63/0876 |
| 2022/0292488 | A1* | 9/2022 | Yan | G06Q 20/3678 |
| 2023/0134651 | A1* | 5/2023 | Agbamu | G06V 40/172 |
| | | | | 705/325 |
| 2023/0161898 | A1* | 5/2023 | Soundararajan | G06F 16/2455 |
| | | | | 726/29 |
| 2023/0245189 | A1* | 8/2023 | Sathyan | G06Q 30/018 |
| | | | | 705/75 |
| 2023/0275773 | A1* | 8/2023 | Jacob | H04L 9/3247 |
| | | | | 713/193 |
| 2024/0320657 | A1* | 9/2024 | Patton | G06Q 20/389 |
| 2024/0323185 | A1* | 9/2024 | Seethalakshmi | G06Q 50/40 |
| 2025/0039199 | A1* | 1/2025 | Thompson | H04L 63/1441 |

FOREIGN PATENT DOCUMENTS

| | | | | | |
|---|---|---|---|---|---|
| CA | 3136977 | A1 | * | 5/2022 | ......... G06F 21/6227 |
| CN | 111709046 | A | * | 9/2020 | |
| CN | 112187931 | A | * | 1/2021 | |
| CN | 113519007 | A | * | 10/2021 | ............ G06F 21/45 |
| EA | 015031 | B1 | * | 4/2011 | ............ G06Q 20/10 |
| JP | 2000516743 | A | * | 9/1996 | |
| KR | 102480890 | B1 | * | 12/2022 | ......... H04L 67/1097 |
| KR | 20250041857 | A | * | 3/2025 | ............ G06F 17/40 |
| WO | WO-2015116634 | A1 | * | 8/2015 | ........ G06Q 30/0278 |
| WO | WO-2015145215 | A1 | * | 10/2015 | ............ G06Q 30/06 |
| WO | WO-2017023757 | A1 | * | 2/2017 | ............ G06Q 20/20 |
| WO | WO-2019226489 | A1 | * | 11/2019 | ......... G06Q 20/3678 |
| WO | WO-2020052578 | A1 | * | 3/2020 | ......... G06Q 10/1053 |
| WO | WO-2020145964 | A1 | * | 7/2020 | ........... G06Q 20/401 |
| WO | WO-2021010991 | A1 | * | 1/2021 | ........... G06F 21/608 |
| WO | WO-2022016280 | A1 | * | 1/2022 | ............ G06F 16/27 |
| WO | WO-2022119767 | A1 | * | 6/2022 | ............ G06Q 20/02 |
| WO | WO-2024130039 | A1 | * | 6/2024 | ........ G06Q 20/3825 |

OTHER PUBLICATIONS

R. Akkaoui, X. Hei and W. Cheng, "EdgeMediChain: A Hybrid Edge Blockchain-Based Framework for Health Data Exchange," in IEEE Access, vol. 8, pp. 113467-113486, 2020. https://ieeexplore.ieee.org/document/9121216?source=IQplus (Year: 2020).*

Ur Rahman, Mohsin, Scalable Role-based Access Control Using The EOS Blockchain, Cornell University, Jul. 4, 2020. https://arxiv.org/abs/2007.02163 (Year: 2020).*

I. A. Moursy, S. M. Ghanem and M. N. ElDerini, "A Blockchain-Based Architecture for Access Control Management of IoT Applications," 2022 IEEE Symposium on Computers and Communications (ISCC), Rhodes, Greece, 2022, pp. 1-6, https://ieeexplore.ieee.org/document/9912781?source=IQplus (Year: 2022).*

* cited by examiner

MANAGEMENT PLATFORM FOR COMMUNITY ASSOCIATION MGCOne ONLINE PLATFORM AND MARKETPLACE

CROSS-REFERENCE TO RELATED APPLICATIONS

The present application claims priority to U.S. Provisional Patent Application No. 63/304,062 filed Jan. 28, 2022, entitled "MGCOne marketplace and technology platform" which is hereby incorporated by reference in its entirety.

FIELD OF DISCLOSURE

The present disclosure generally relates to management of community associations, and more particularly, to blockchain-based automated system for real-time management platform for community associations.

BACKGROUND

The purpose of the community management industry is to serve the needs of every community via its community association. However, the current focus has been all about the service providers such as community management companies who are mainly competing with other service providers for the community associations' business. Typically, each service provider has its proprietary technology solutions to provide differentiated services from their competition.

When a community association hires a service provider, they are required to use the service provider's technology, policies, procedures, and record-keeping solutions. When the association switches to another service provider, the outgoing service provider walks away with all the association's information and records. The incoming service provider brings their technology, policies, procedures, and record-keeping solutions—hence resulting in the association losing critical information and records, causing costly rework, and increased financial burden on the association. In other words, the existing management solutions are not association-centric.

Accordingly, an association-centric one-stop-shop technology platform and online marketplace for community associations and service providers are desired. Furthermore, blockchain-based record keeping is desired for efficient and secure distributed storage of association's data and transactions. The blockchain would be leveraging a permissioned (private) blockchain based on third generation blockchain 3.0 for digital society.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for a community association management platform and marketplace. The system includes: a processing component of a management server node connected to a plurality of entities over a blockchain network of the association management platform and/or marketplace, and a memory component on which are stored machine-readable instructions that when executed, cause the processing component to: receive an onboarding request from an entity off chain; parse the onboarding request to derive a role of the entity; broadcast the onboarding request and the role to a plurality of minimum required entities on the blockchain network; be responsive to receiving an onboarding consensus from the plurality of minimum required entities, onboard the entity onto the association management platform and/or marketplace; establish a digital identity and credentials for the entity; determine a role of the entity based on the digital identity and credentials; and enable a UI portal for the entity based on the role.

Another embodiment of the present disclosure provides a method that includes one or more of: receiving an onboarding request from an entity off chain; parsing the onboarding request to derive a role of the entity; broadcasting the onboarding request and the role to a plurality of minimum required entities on the blockchain network; responsive to receiving an onboarding consensus from the plurality of minimum required entities, onboarding the entity onto the association management platform and/or marketplace; establish a digital identity and credentials for the entity; determining a role of the entity based on the digital identity and credentials; and enabling a UI portal for the entity based on the role.

Another embodiment of the present disclosure provides a computer-readable medium including instructions for receiving an onboarding request from an entity off chain; parsing the onboarding request to derive a role of the entity; broadcasting the onboarding request and the role to a plurality of minimum required entities on the blockchain network; responsive to receiving an onboarding consensus from the plurality of minimum required entities, onboarding the entity onto the association management platform and/or marketplace; establish a digital identity and credentials for the entity; determining a role of the entity based on the digital identity and credentials; and enabling a UI portal for the entity based on the role.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

Figure 7:
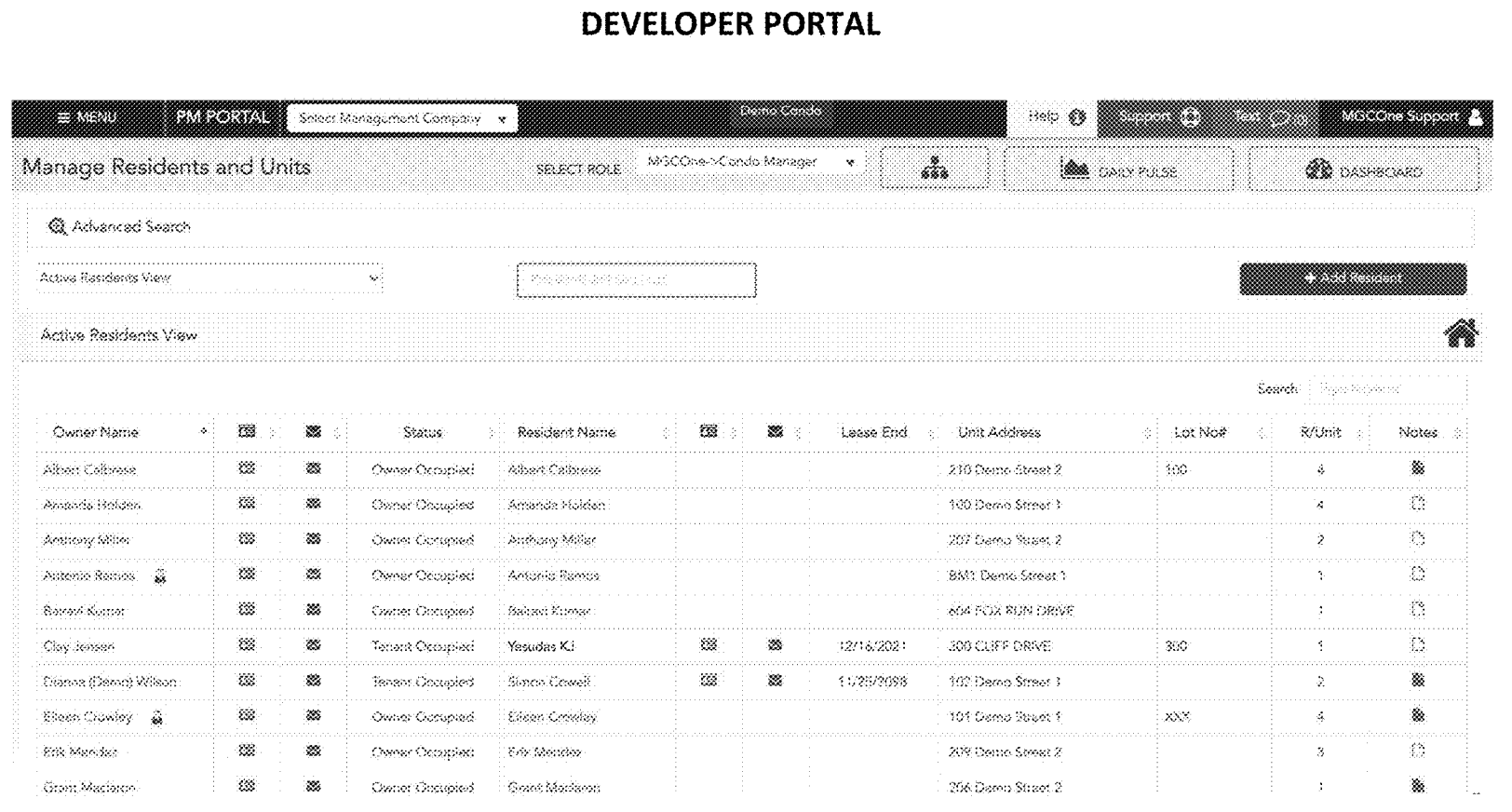

FIG. 7 illustrates a developer portal consistent with the present disclosure;

Figure 8:
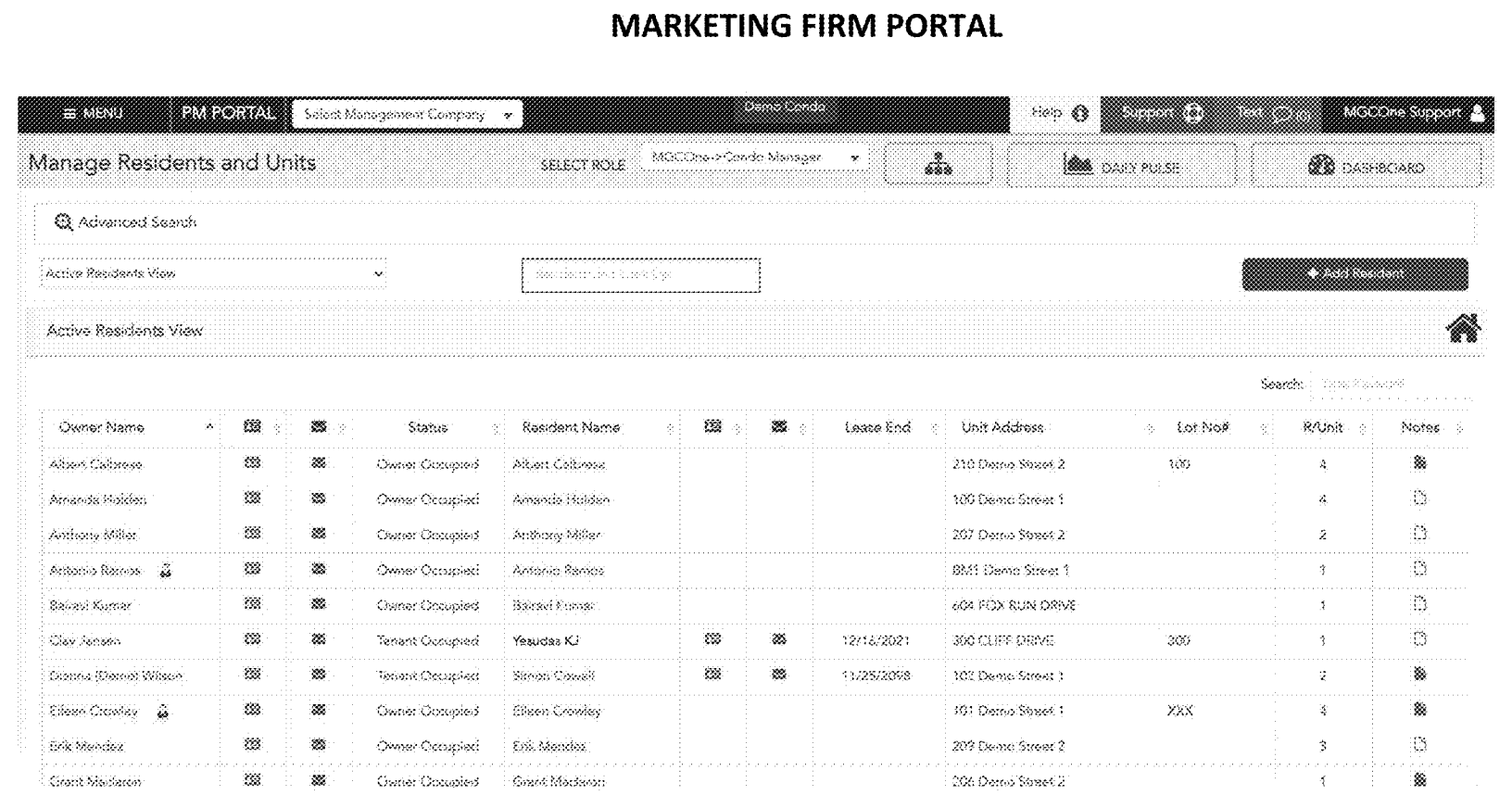

FIG. 8 illustrates a marketing firm portal consistent with the present disclosure;

Figure 9:
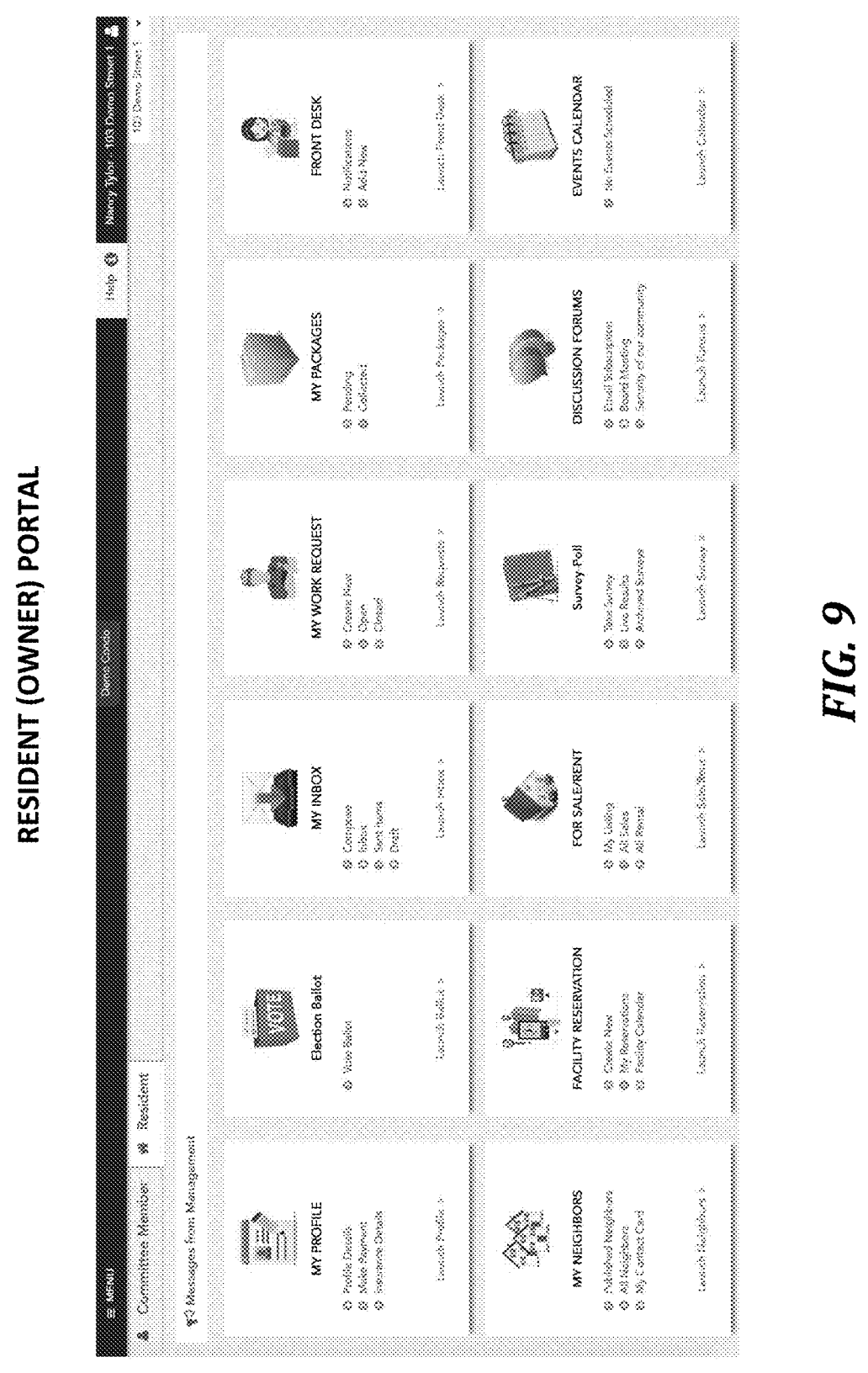

FIG. 9 illustrates a resident (owner) portal consistent with the present disclosure;

Figure 10:
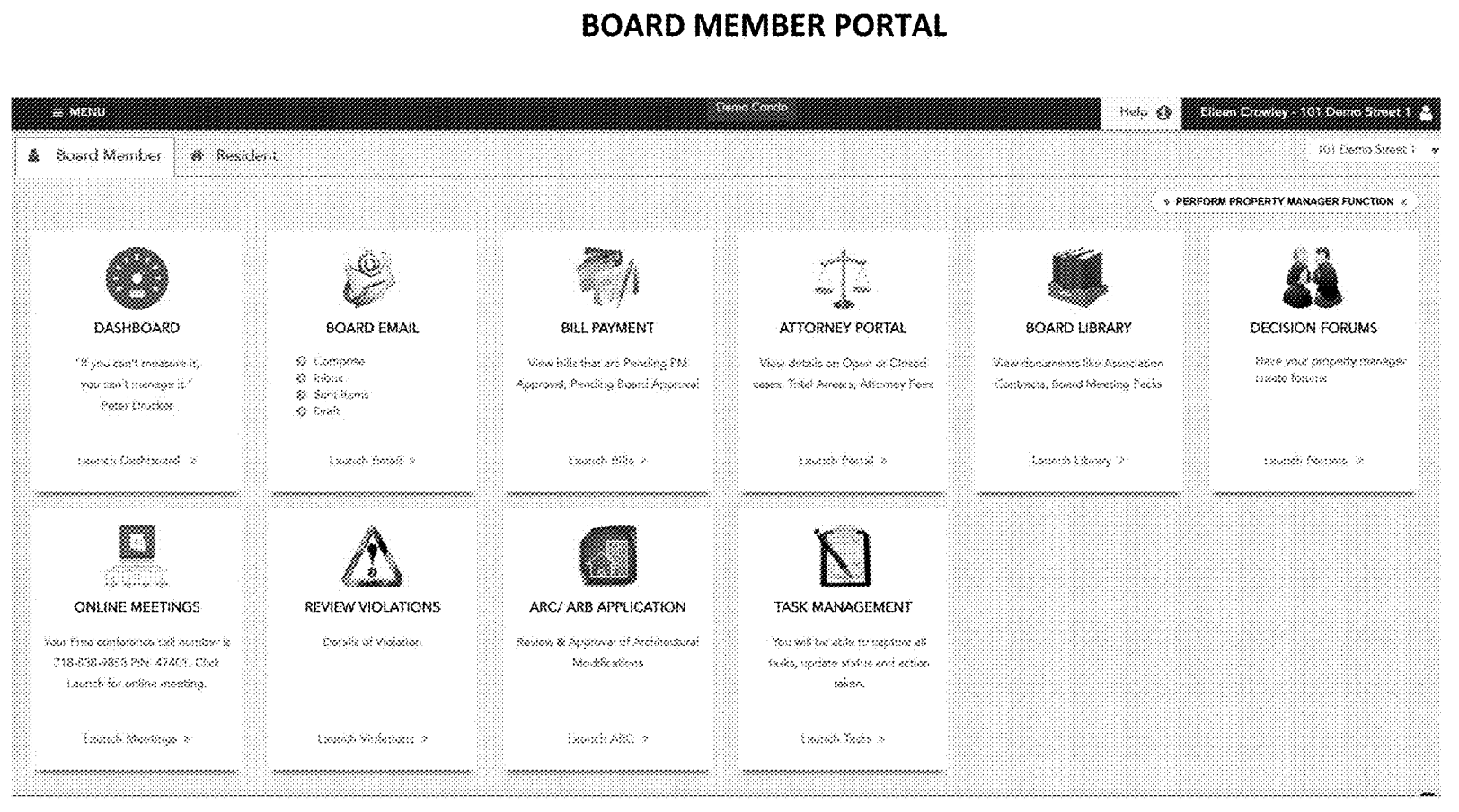

FIG. 10 illustrates a board member portal consistent with the present disclosure;

Figure 13:
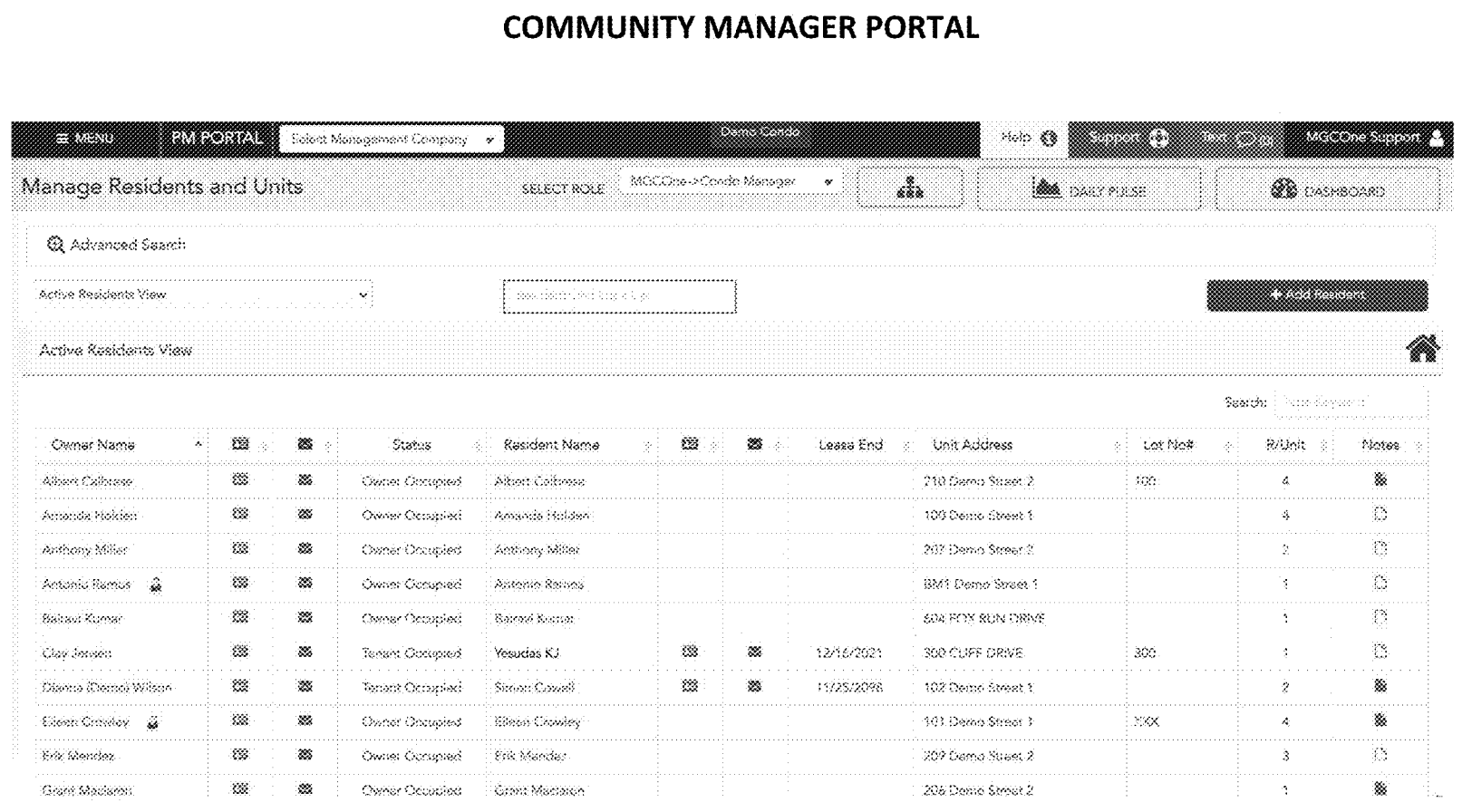

FIG. 13 illustrates a community manager portal consistent with the present disclosure;

Figure 14:
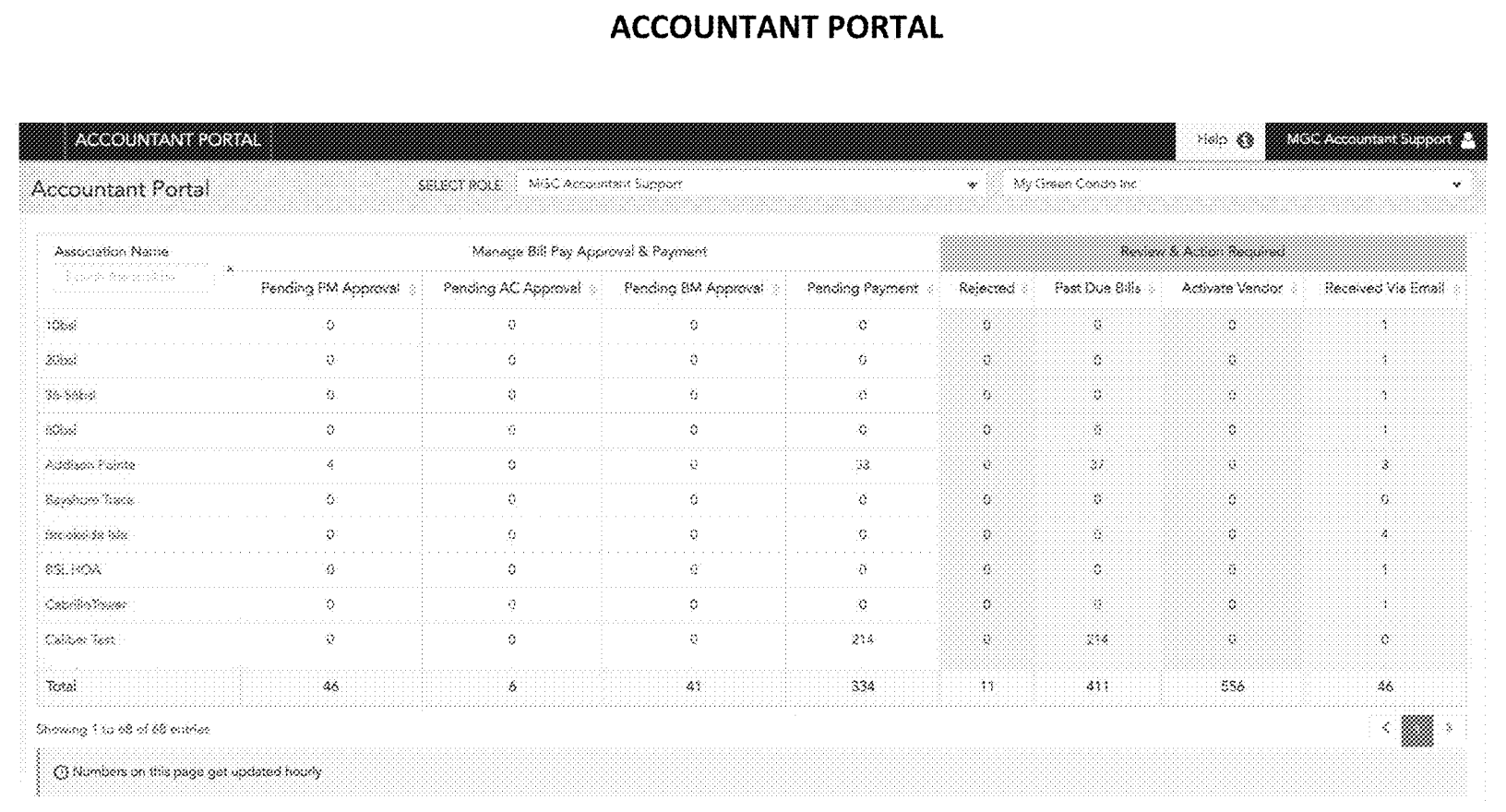

FIG. 14 illustrates an accountant portal consistent with the present disclosure;

Figure 18:
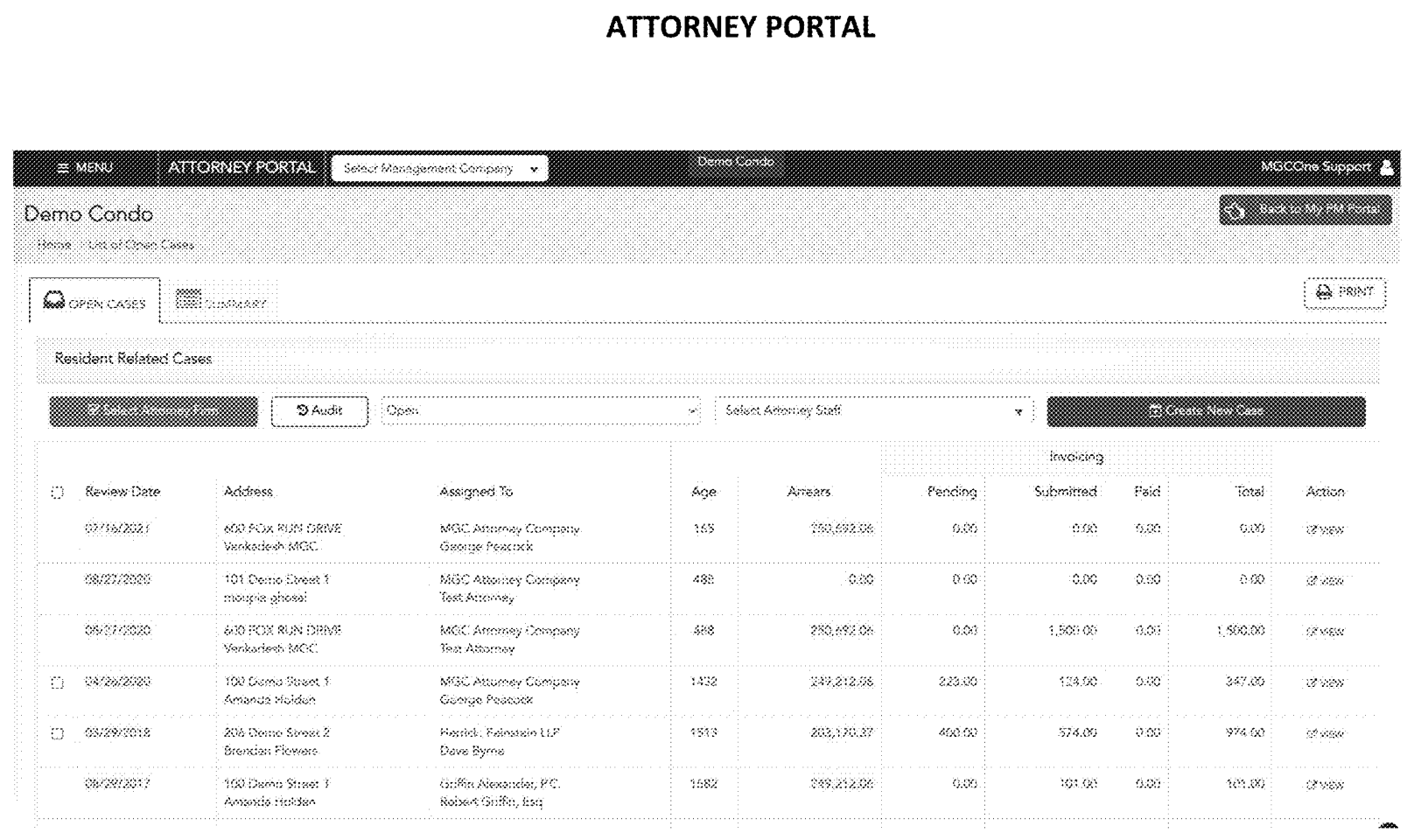

FIG. 18 illustrates an attorney portal consistent with the present disclosure;

Figure 19:
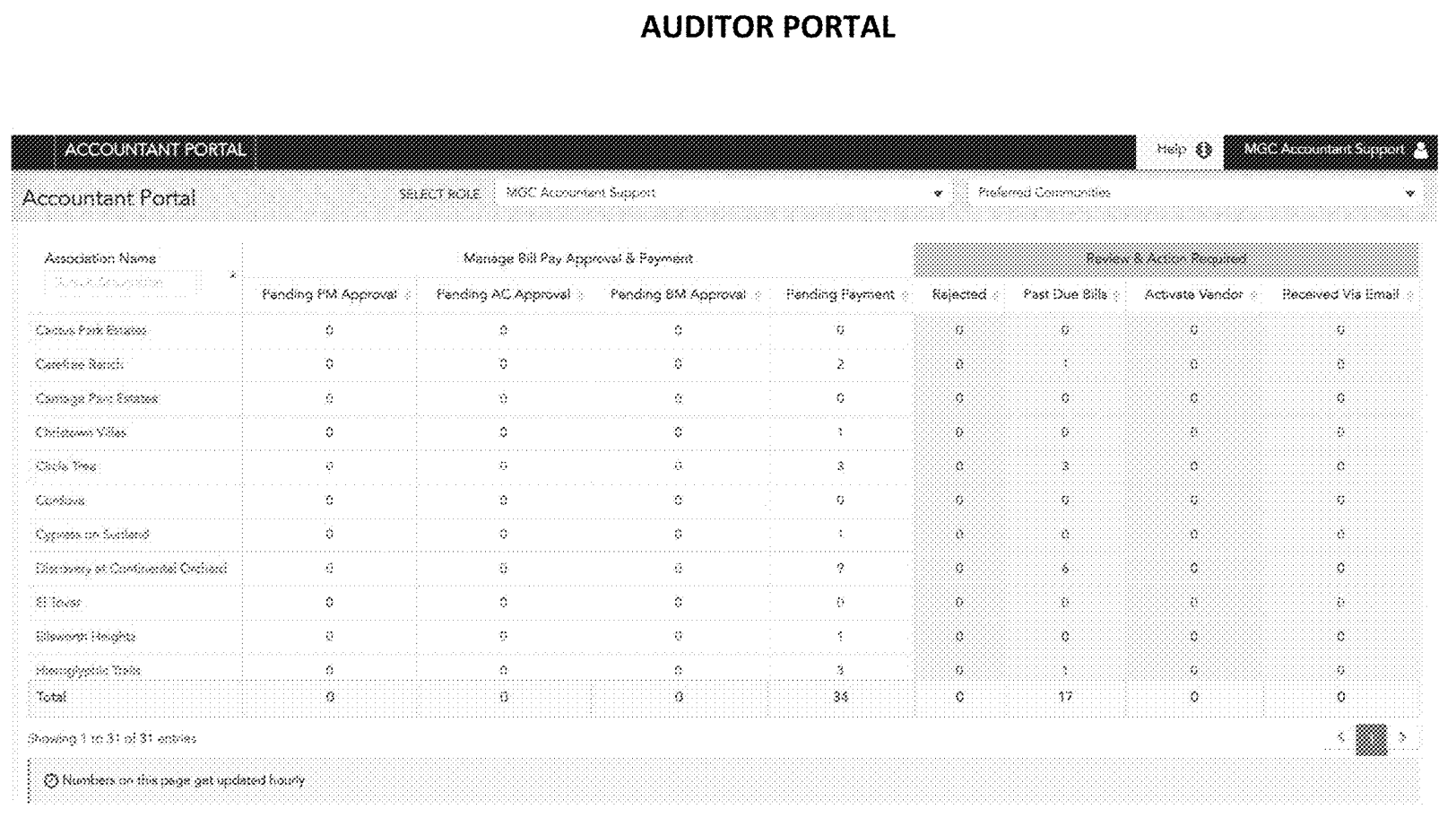

FIG. 19 illustrates an auditor portal consistent with the present disclosure;

DETAILED DESCRIPTION

Figure 1:
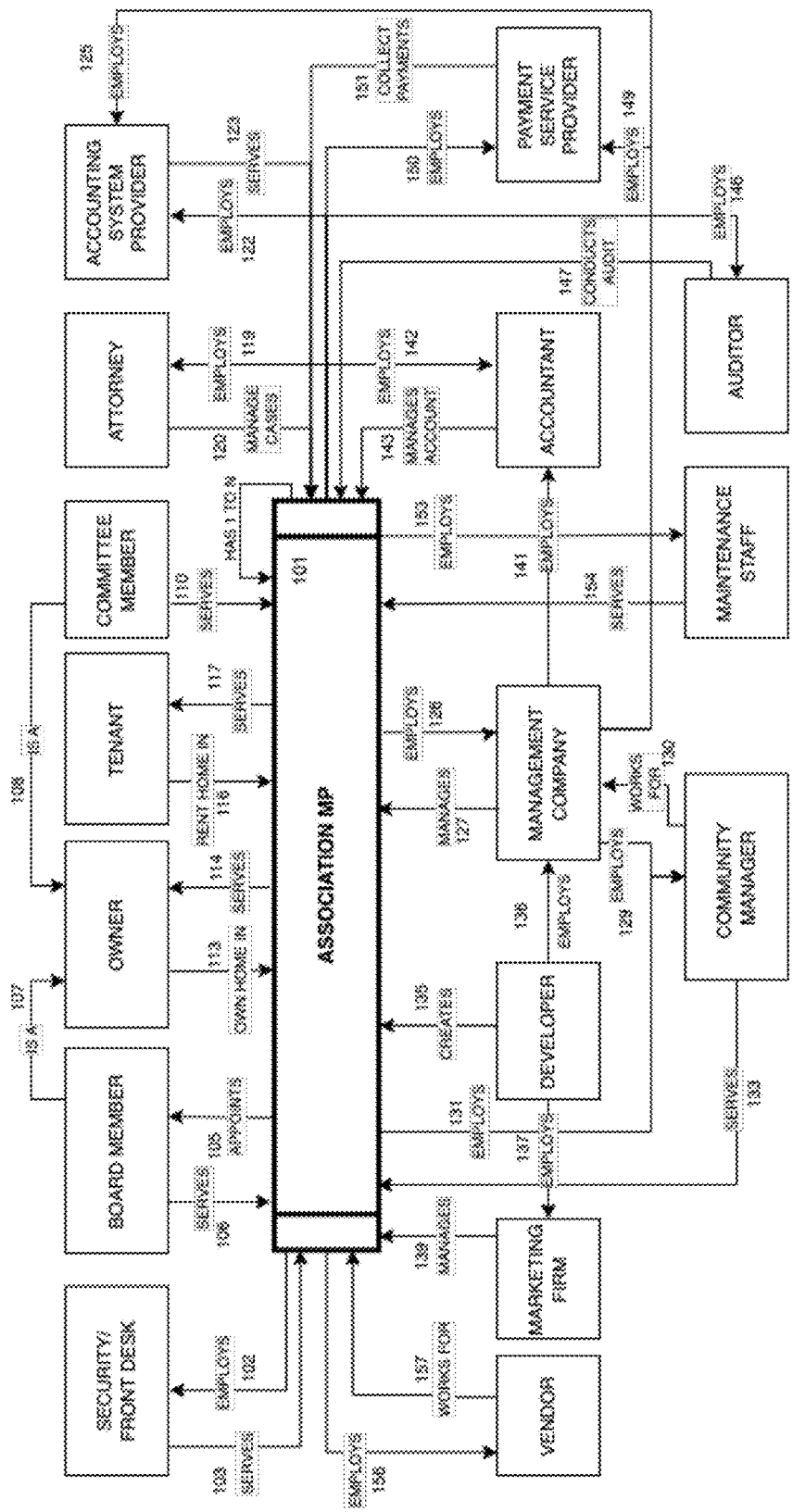
FIG. 1 illustrates an association platform data model consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of processing job applicants, embodiments of the present disclosure are not limited to use only in this context.

The present disclosure provides a system, method and computer-readable medium for blockchain-based association-centric one-stop-shop technology platform and online marketplace for community associations and service providers.

In one embodiment of the present disclosure, the system provides for marketplace that enables community associations to switch service providers seamlessly through a simple process of removing/enabling access privileges. The management platform system also enables service providers with all needed functionality to service the association without requiring alternative technology solutions. The marketplace platform provides a common ground for all service providers to showcase their differentiated services and compete for community associations' business based on their service level as opposed to system capability. The disclosed embodiments, advantageously, provide a win-win solution for both community associations and service providers.

There are multiple role-players involved in the day-to-day management of a community association. According to the disclosed embodiments, all role players are provided with their own dedicated and secured web portals to manage their related functions within the association. Additionally, all service providers can list their services on the marketplace platform to offer their services to the community association. The rendering of services may be provided based on a blockchain consensus of a minimal required number of parties involved. The service-related transactions may be securely recorded on a private (permissioned) blockchain ledger for future audits.

The following exemplary non-limiting use cases may be implemented using the blockchain-based association-centric one-stop-shop technology platform and online marketplace for community associations and service providers disclosed herein.

1. Community Developer-when launching a new community development project, developers can onboard the community association on the management/marketplace platform and incorporate community management as a marketing value proposition. Also, the Community Developer may be able to manage all activities related to the sale of homes to individual homeowners within the association using the management/marketplace platform.

2. Marketing Firms—brought in by the developer, the marketing firms manage and complete the sale of all new homes within the association. They marketing firms have a secured portal to manage all pre and post-sales activities for all homeowners within the association.

3. Homeowner—all homeowners will have their portal to manage all their activities within the association.

4. Tenant—every tenant within the association will have a portal to manage their activities within the association.

5. Board Members—elected board members of the association will have a separate portal to manage all association activities related to the day-to-day operations of the association.

6. Committee Member—each appointed committee member of the association will be given a separate portal to manage all committee-related activities within the association.

7. Management Company—every management company will be given a portal to manage all the associations in their portfolio on the management platform with full functionality related to the day-to-day management of their communities.

8. Community Manager—will also have a dedicated portal to manage all associations that are on the management platform.

9. Accountant—will have a portal to manage all day-to-day accounting activities related to associations under their management on the management platform.

10. Maintenance Staff—will have a portal to manage daily responsibilities that are assigned to them by association management.

11. Security/Concierge—will have a dedicated portal to manage all the day-to-day responsibilities that are assigned to them by association management.

12. Vendors—a portal to serve and interact with association management for all the associations that they service on the management platform.

13. Attorneys—will also have a dedicated portal to manage all legal cases related to associations under their management on the management platform.

14. Auditor—will have a portal to conduct a full audit of the financial year for all the associations that they service and have subscribed to management platform connected to a private (permissioned) blockchain ledger.

15. Payment Service Providers—will be able to integrate with management platform to enable their services for associations that utilize their service for payment processing over the permissioned blockchain.

16. Accounting Systems—all leading accounting application service providers may be able to connect to management platform and offer their accounting services to community associations and service providers.

17. All other service providers can connect to the management platform and offer their services for associations either directly or via other service providers.

Note that the association can efficiently maintain continuity—i.e., retain all information and records to achieve continuity of operations based on the secure blockchain assets and transaction records.

FIG. 1 illustrates a management platform data model 100 consistent with disclosed embodiments.

Referring to FIG. 1, the Association Data Model depicts the relationship between the various entities and the Association entity (peers) within the Association blockchain network. There may be variety of Association entities within an Association blockchain, in special situations. In one embodiment, there may be multiple Association blockchains.

An Association Management Platform (MP) 101 entity (primary entity) has relationships with other entities such as Board member, Management company, Owner, Tenant, etc. These relationships are established as service contracts in the Association blockchain on the management platform. An Association entity can have 1 to n association entities related to it. These consensual relationships may be established within the Association blockchain. The primary entity's relationship to another entity is created when access is granted and approved (based on the consensus) on the Association blockchain. All entities may have access to the primary entities data once approved in the Association blockchain.

Security/Front desk 102 entity establishes a relationship with the primary entity via a service contract on the Association block chain through the management platform. Once approved as an entity on the Association blockchain, the security/front desk 102 entity's service APIs is available for the association's use via the management platform.

Board Member 103 entity establishes a relationship with the primary entity via a service contract on the Association block chain over the management platform. Once approved as an entity on the Association blockchain, Board Member 106 entity has access to association's data via the management platform. The board member 106 entity is a specialized Owner 107 entity within the association blockchain. Committee member 108 entity is a specialized Owner entity within the Association blockchain.

Committee Member 110 entity establishes a relationship with the primary entity 101 via a service contract on the Association blockchain of the management platform. Owner entity 113 establishes a relationship with the primary entity 101 via a purchase agreement/contract on the Association blockchain of the management platform. Once approved as an entity on the Association blockchain, the Owner entity 113 has access 114 to association's data via the management platform. Tenant entity 116 establishes a relationship with the primary entity 101 via a rental agreement/contract on the Association blockchain of the management platform. Once approved as an entity on the Association blockchain, the Tenant entity 116 may have access 117 to association's data via the management platform.

Attorney entity 119 establishes a relationship with the primary entity 101 via a service contract on the Association blockchain of the management platform. Once approved as an entity on the Association blockchain, the Attorney entity's service APIs 120 are available for the association's use via the management platform.

Accounting System Provider entity 122 establishes a relationship with the primary entity 101 via a service contract on the Association blockchain of the management platform. Once approved as an entity on the Association blockchain, the Accounting System Provider entity's service APIs 123 are available for the association's use via the management platform.

Management Company 126 entity establishes a relationship 125 with the Accounting System Provider 122 via a service contract on the Marketplace blockchain of the management platform. Management Company 126 entity establishes a relationship with the primary entity 101 via a service contract on the Association blockchain pf the management platform. Once approved as an entity on the Association blockchain, the Management Company entity's service APIs 127 are available for the association's use via the management platform. Management Company entity establishes a relationship with the Community Manager 129 via a service contract on the Marketplace blockchain of the management platform. Once approved as an entity on the Marketplace blockchain, Community Manager entity's is available for the Management Company 130 use via the management platform.

Community Manager entity establishes a relationship 131 with the primary entity 101 via a service contract on the Association blockchain of the management platform. Once approved as an entity on the Association blockchain, the Community Manager 129 entity is available (over 133) for the association's use via the management platform. Developer entity 135 establishes a relationship with the primary entity 101 via a service contract on the Marketplace blockchain of the management platform. The Developer entity 135 establishes a relationship 136 with the Management Company via a service contract on the Marketplace blockchain. The Developer entity establishes a relationship 137 with the Marketing Firm via a service contract on the Marketplace blockchain of the management platform.

The Marketing Firm establishes a relationship 139 with Association via a service contract on the Association blockchain. Once approved as an entity on the Association blockchain, the Marketing Firm's service is available for the association's use via the management platform. Accountant entity 141 establishes a relationship with the Management Company via a service contract on the Marketplace blockchain.

The Accountant entity 141 establishes a relationship 142 with the Management Company via a service contract on the Marketplace blockchain. Once approved as an entity on the Association blockchain, the Accountant entity's service 143 is available for the association's use via the management platform. Auditor entity 146 establishes a relationship with the primary entity 101 via a service contract on the Association blockchain. Once approved as an entity on the Association blockchain, the Auditor entity's service 147 is available for the association's use via the management platform. Payment Service Provider entity 149 establishes a relationship with the Management Company via a service contract on the Marketplace blockchain.

The Payment Service Provider entity 149 establishes a relationship 150 with the primary entity 101 via a service contract on the Association blockchain. Once approved as an entity on the Association blockchain, the Payment Service Provider entity's service API 151 is available for the association's use via the management platform. The Maintenance Staff entity establishes a relationship 153 with the primary entity 101 via a service contract on the Association blockchain. Once approved as an entity on the Association blockchain, the Maintenance Staff entity's service 154 is available for the association's use via the management platform. Vendor entity establishes a relationship 156 with the primary entity 101 via a service contract on the Association blockchain. Once approved as an entity on the Association blockchain, the Vendor entity's service 157 is available for the association's use via the management platform.

Figure 2:
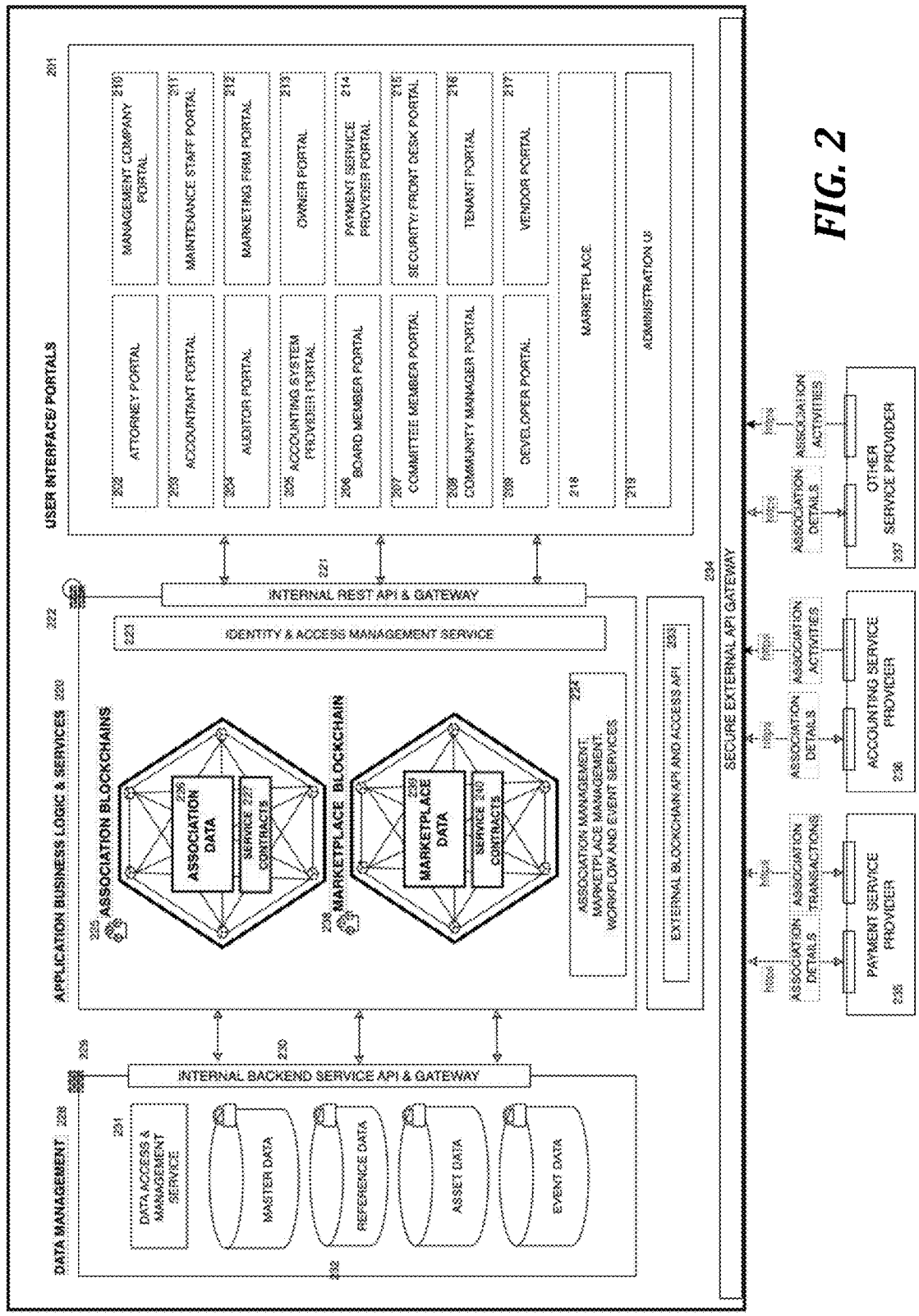
FIG. 2 illustrates blockchain-based association management platform and marketplace consistent with the present disclosure.

FIG. 2 illustrates platform logical architecture 200 consistent with disclosed embodiments.

Referring to FIG. 2, the diagram represents a logical architectural of the various components within the management online platform and marketplace. The architecture is a multi-tier architecture with User interface (UI), Business logic layer, Application Server, and Management blockchains, API layer and data management layers.

The User Interface/portals layer 201 represents various persona-based web front-ends. There are various portals that are catered with specific functionality associated to the personas (i.e., roles). Attorney portal 202 is a web-based user interface that is catered to the Attorney persona. All features and functionality are enabled via identity and access management controls. The portal exposes the attributes, relationships and capabilities of an Attorney entity via Association or via a Marketplace. Accountant portal 203 is a web-based user interface that is catered to the Accountant persona. All features and functionality are enabled via identity and access management controls. The portal exposes the attributes, relationships and capabilities of an Accountant entity via the Association or via the Marketplace.

Auditor portal 504 is a web-based user interface that is catered to the Auditor persona. All features and functionality are enabled via identity and access management controls. The portal exposes the attributes, relationships and capabilities of an Auditor entity via the Association or via the Marketplace. Accounting System Provider portal 205 is a web-based user interface that is catered to the Accounting System Provider persona. All features and functionality are enabled via identity and access management controls. The portal exposes the attributes, relationships and capabilities of the Accounting System Provider entity via the Association or via the Marketplace.

Board Member portal 206 is a web-based user interface that is catered to the Board Member persona. All features and functionality are enabled via identity and access management controls. The portal exposes the attributes, relationships and capabilities of the Board Member entity via the Association or via the Marketplace. Committee Member portal 207 is a web-based user interface that is catered to the Committee Member persona. All features and functionality are enabled via identity and access management controls. The portal exposes the attributes, relationships and capabilities of the Committee Member entity via the Association or via the Marketplace. Community Manager portal 208 is a web-based user interface that is catered to the Community Manager persona. All features and functionality are enabled via identity and access management controls. The portal exposes the attributes, relationships and capabilities of the Community Manager entity via the Association or via the Marketplace.

Developer portal 209 is a web-based user interface that is catered to the Developer persona. All features and functionality are enabled via identity and access management controls. The portal exposes the attributes, relationships and capabilities of a Developer entity via the Association or via the Marketplace. Management Company portal 210 is a web-based user interface that is catered to the Management Company persona. All features and functionality are enabled via identity and access management controls. The portal exposes the attributes, relationships and capabilities of a Management Company entity via the Association or via the Marketplace.

Maintenance Staff portal 211 is a web-based user interface that is catered to the Maintenance Staff persona. All features and functionality are enabled via identity and access management controls. The portal exposes the attributes, relationships and capabilities of the Maintenance Staff entity via the Association or via the Marketplace. Marketing Firm portal 212 is a web-based user interface that is catered to the Marketing Firm persona. All features and functionality are enabled via identity and access management controls. The portal exposes the attributes, relationships and capabilities of the Marketing Firm entity via the Association or via the Marketplace. Owner portal 213 is a web-based user interface that is catered to the Owner persona. All features and functionality are enabled via identity and access management controls. The portal exposes the attributes, relationships and capabilities of the Owner entity via the Association or via the Marketplace.

Payment Service Provider portal 214 is a web-based user interface that is catered to the Payment Service Provider persona. All features and functionality are enabled via identity and access management controls. The portal exposes the attributes, relationships and capabilities of the Payment Service Provider entity via the Association or via the Marketplace. Security/Front Desk portal 215 is a web-based user interface that is catered to the Security/Front Desk persona. All features and functionality are enabled via identity and access management controls. The portal exposes the attributes, relationships and capabilities of the Security/Front Desk entity via the Association or via the Marketplace. Tenant portal 216 is a web-based user interface that is catered to the Tenant persona. All features and functionality are enabled via identity and access management controls. The portal exposes the attributes, relationships and capabilities of the Tenant entity via the Association or via the Marketplace. Vendor portal 217 is a web-based user interface that is catered to the Vendor persona. All features and functionality are enabled via identity and access management controls. The portal exposes the attributes, relationships and capabilities of the Vendor entity via the Association or via the Marketplace.

Marketplace 218 is a web-based user interface that is created for all entities to market or consume services from other service providers. All entities will establish a relationship with the Marketplace via a service contract on the marketplace blockchain. Administration UI 219 is a web-based user interface that is catered to the Admin persona. All features and functionality are enabled via identity and access management controls. The portal exposes the attributes, relationships and capabilities of the Admin entity via the Association or via the Marketplace. The Application Business Logic and Services layer 220 includes Business logic layer, Association blockchains, Marketplace blockchain, Internal API layer, External Blockchain and REST API layer, and other core components.

The internal API gateway 221 is secure and only exposed to internal traffic within the application. The internal REST APIs are mainly accessed by the user interface layer. All data is encrypted in transit. The Web Application Firewall 222 is configured to protect the business layer from unauthorized access. The Identity and Access Management (IAM) service 223 enables identity management, authentication and authorization to services. This service entitles the User Interface layer with access token mechanisms.

The core components 224 provide core business functionality for the Management platform and the marketplace.

Association blockchain(s) 225 is one of the major and is the fundamental component of the Management platform. The platform supports the creation of 1-to-many Association blockchains and maintains the various relationships to the Association within the blocks through service contracts that may be implemented as smart contracts. Each entity that gets attached to the blockchain will go through a consensus-based approval process before becoming a registered entity. All data 226 associated to the Association will be stored within the blockchain and backend storage. All Association service contracts 227 (new or updated) will be maintained on the Association Blockchain.

The Data Management Layer 228 constitutes the backend data of the Management platform and Marketplace. The Data Management Layer 228 is protected with Identity and Access Management (IAM), Network Access Controls, HW and SW firewalls. The internal backend API gateway 230 is secure and only exposed to the application business logic layer via strict IAM rules and controls. The Data Access and Management Service 231 exposes data access APIs via the internal backend API gateway. All data is encrypted in transit. All data is stored securely. Confidential data is encrypted at rest. Data may be segregated based upon which Association blockchain the data belongs to. External Blockchain API and Access API 233 are only exposed to those that are either on the Association or Marketplace blockchain. All data in encrypted in transit.

A separate Secure External API gateway 234 is established for data transfers/transactions with external entities outside the Management Online Platform and Marketplace. A Payment Service Provider 235 establishes a relationship with the Marketplace via a service contract on the Marketplace blockchain of the Management platform. The Payment Service Provider 235 establishes a relationship with an Association via a service contract (i.e., smart contracts) on the Association blockchain. Once approved as an entity on the Association blockchain, the Payment Service Provider service API is available for the association's use and Management's API is available for the Payment Service Provider via the Secure External API gateway on the Management platform.

An Accounting Service Provider 236 establishes a relationship with the Marketplace via a service contract on the Marketplace blockchain of the Management platform. The Accounting Service Provider 236 establishes a relationship with an Association via a service contract on the Association blockchain. Once approved as an entity on the Association blockchain, the Accounting Service Provider service API is available for the association's use and Management's API is available for the Accounting Service Provider via the Secure External API gateway on the Management platform. Similar to the Accounting Service and Payment Service Providers, other Service Providers 237 can be enabled and serviced on the Management platform.

Marketplace blockchain 238 is one of the major components of the Management platform. The platform supports the creation of a Marketplace blockchain and maintains the various entity relationships to the Marketplace within the blocks through service contracts such as smart contracts. Each entity that gets attached to the blockchain will go through consensus-based approval process before becoming a registered entity om the Marketplace blockchain. All data 239 associated to the Marketplace will be stored within the blockchain and backend storage. All Marketplace service contracts 240 (new or updated) will be maintained on the Marketplace Blockchain.

Figure 3:
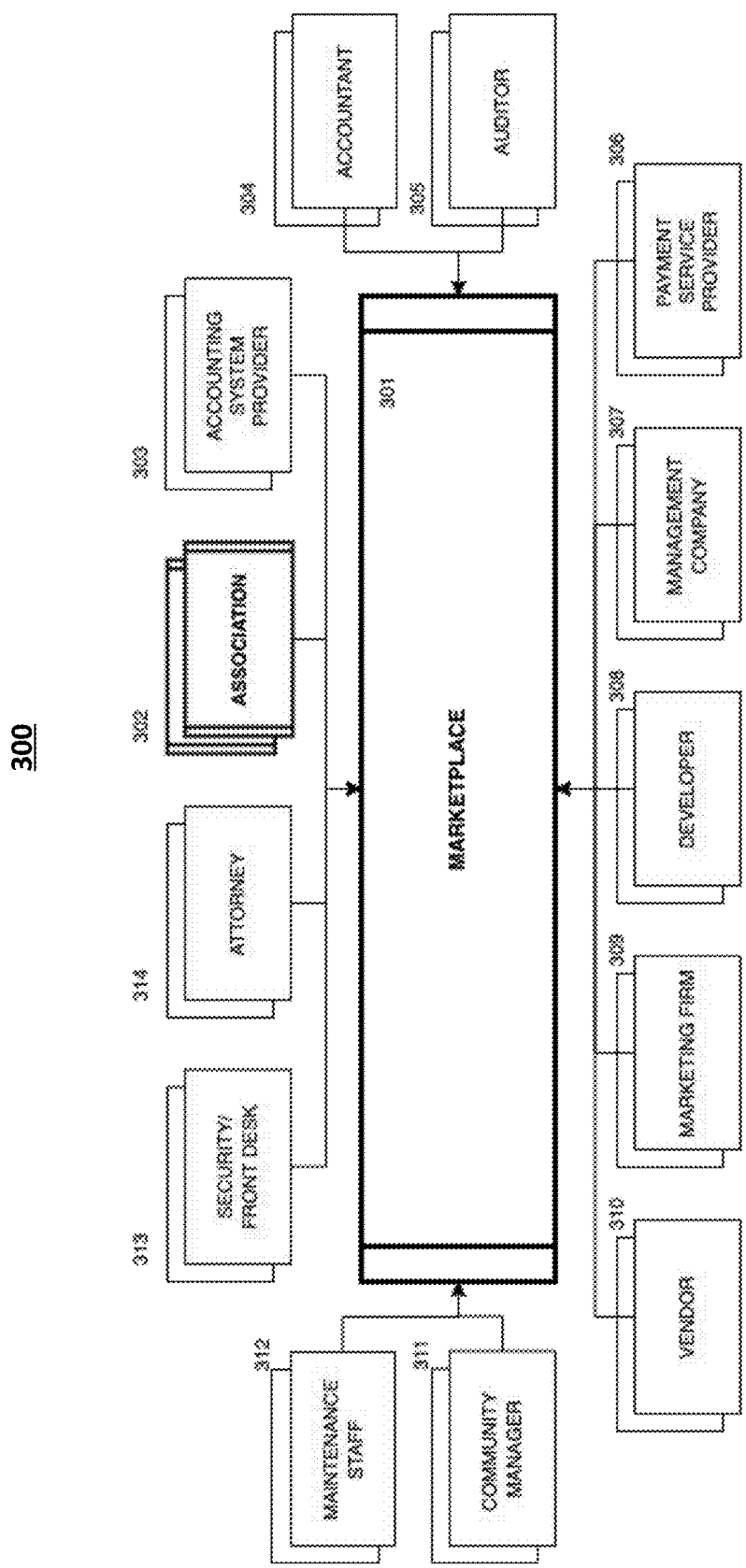
FIG. 3 illustrates a marketplace data model consistent with the present disclosure.

FIG. 3 illustrates Marketplace data model 300 consistent with the disclosed embodiments.

Referring to FIG. 3, the Marketplace data model 300 depicts the relationship between the various entities and the Marketplace entity within the Marketplace blockchain.

The Marketplace entity 301 has relationships with other entities such as Association, Management company, Accounting System Provider, etc. These relationships are established as service contracts in the Marketplace blockchain on the Management platform. An Association entity 302 establishes a relationship with the Marketplace via a service contract on the Marketplace blockchain of the Management platform. An Accounting System Provider entity 303 establishes a relationship with the Marketplace via a service contract on the Marketplace blockchain of the Management platform. An Accountant entity 304 establishes a relationship with the Marketplace via a service contract on the Marketplace blockchain in Management platform. An Auditor entity 305 establishes a relationship with the Marketplace via a service contract on the Marketplace blockchain of the Management platform.

A Payment Service Provider entity 306 establishes a relationship with the Marketplace via a service contract on the Marketplace blockchain of the Management platform. A Management Company entity 307 establishes a relationship with the Marketplace via a service contract on the Marketplace blockchain in Management platform. A Developer entity 308 establishes a relationship with the Marketplace via a service contract on the Marketplace blockchain in Management platform. A Marketing Firm entity 309 establishes a relationship with the Marketplace via a service contract on the Marketplace blockchain of the Management platform.

A Vendor entity 310 establishes a relationship with the Marketplace via a service contract on the Marketplace blockchain in Management platform. A Community Manager entity 311 establishes a relationship with the Marketplace via a service contract on the Marketplace blockchain of the Management platform. Maintenance Staff entity 312 establishes a relationship with the Marketplace via a service contract on the Marketplace blockchain of the Management platform. A Security/Front Desk entity 313 establishes a relationship with the Marketplace via a service contract on the Marketplace blockchain of the Management platform. An Attorney entity 314 establishes a relationship with the Marketplace via a service contract on the Marketplace blockchain of the Management platform.

Figure 4:
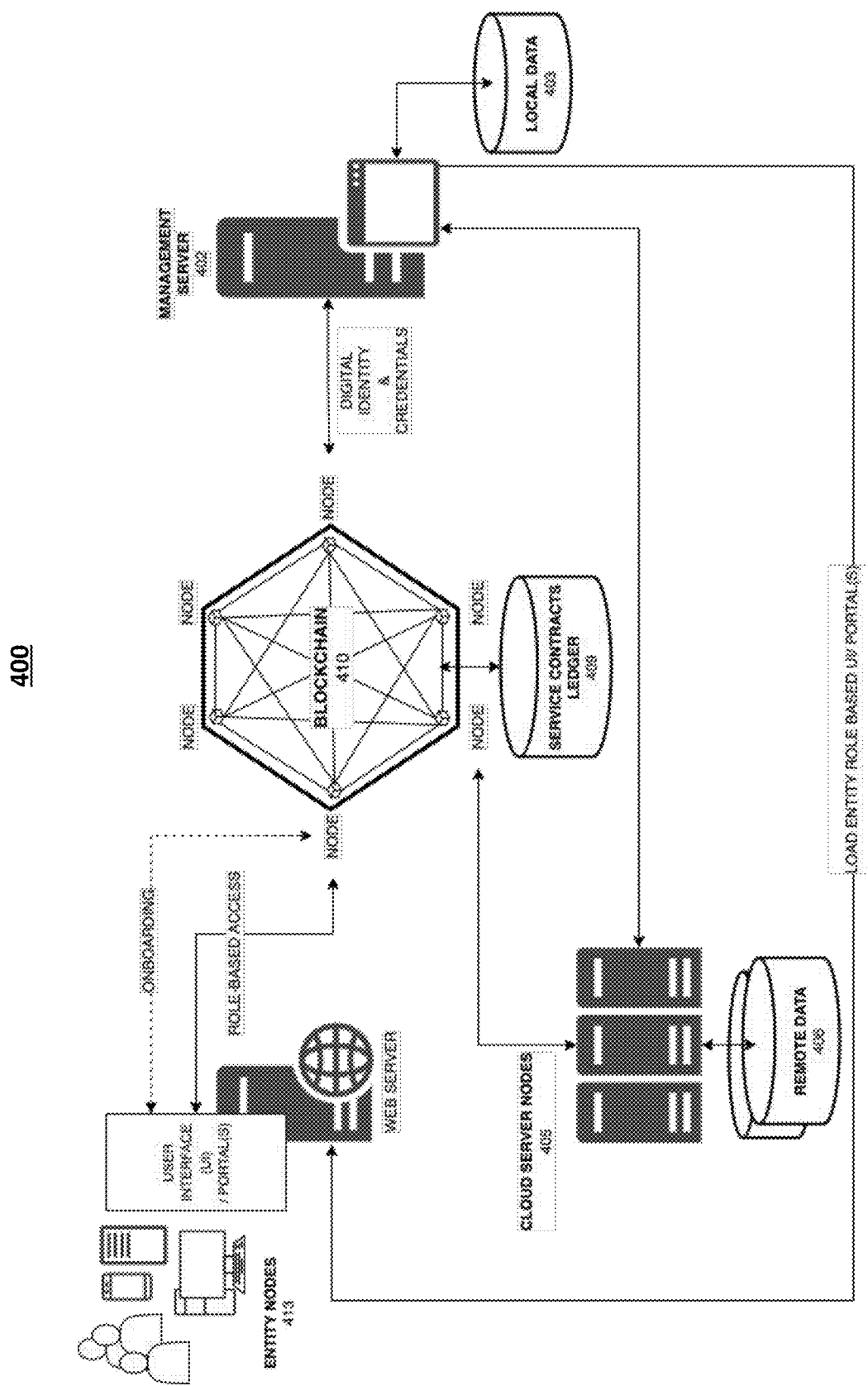
FIG. 4 illustrates a network diagram of a system for blockchain-based association management platform and marketplace consistent with the present disclosure.

FIG. 4 illustrates a network diagram of a system for a blockchain-based automated system for real-time management platform for community associations consistent with the present disclosure.

Referring to FIG. 4, the example network 400 includes the management server node 402 connected to a cloud server node(s) 405 over a network. The connection may be implemented on or off a blockchain 410. The management server node 402 is configured to onboard the entities 413 onto an association management platform and/or marketplace that is implemented on the management server node 402. The management server node 402 may receive onboarding request from one of the entities 413. The management server node 402 may acquire blockchain consensus from other entities for onboarding the requesting entity. For example, the management server node 402 may acquire consensus from a minimum required number of board member nodes to onboard a vendor or a marketing firm into the association management platform. In one embodiment, the management server node 402 may query a local database 403 for the historical local data pertaining to existing entities or previous entities in order to present this information to the entities that are required to provide the consensus. For example, if a new vendor is requesting to onboard, the management server node 402 may check for other similar vendors already existing on the association management platform or for the vendors who previously existed and left or were offboarded for some reason.

In one embodiment, the management server node 402 may acquire relevant remote data a remote database residing on a cloud server 405 off chain. The remote data 406 may be collected from other associations using the same association management platform. This way, an entity that did not have a very good track record with another association may not be allowed to be onboarded to the current association.

Once the entity 413 is onboarded onto the management platform, the management server node 402 may provide role-based credentials to that entity. The entity's data and credentials may be recorded on a ledger 409 of the blockchain 410. This way, whenever this entity logs into the management platform using its role-based credentials, the management server may analyze the role of the entity and may instantiate an API(s) to provide a corresponding UI portal to the that entity based on the role. For example, if the entities' 413 role is determined to be a developer, the developer portal is enabled for the entity. Likewise, if the role is determined to be a marketing firm, the marketing firm portal is enabled for the entity. Examples of various role-based UI portals are shown in FIGS. 7-19. Note that the data populating the UI portal may be derived from the ledger 409 for increased security. In order to receive the data required by a particular entity using the dedicated UI portal, a smart contract(s) may be executed by the API(s) associated with the particular UI portal. In this exemplary embodiment, all entity device 413 and the management server node 402 serve as peers of the blockchain 410. In one embodiment, the management server node 402 may connect to a web server for loading appropriate UI portals and providing them to the entity devices 413.

Figure 5:
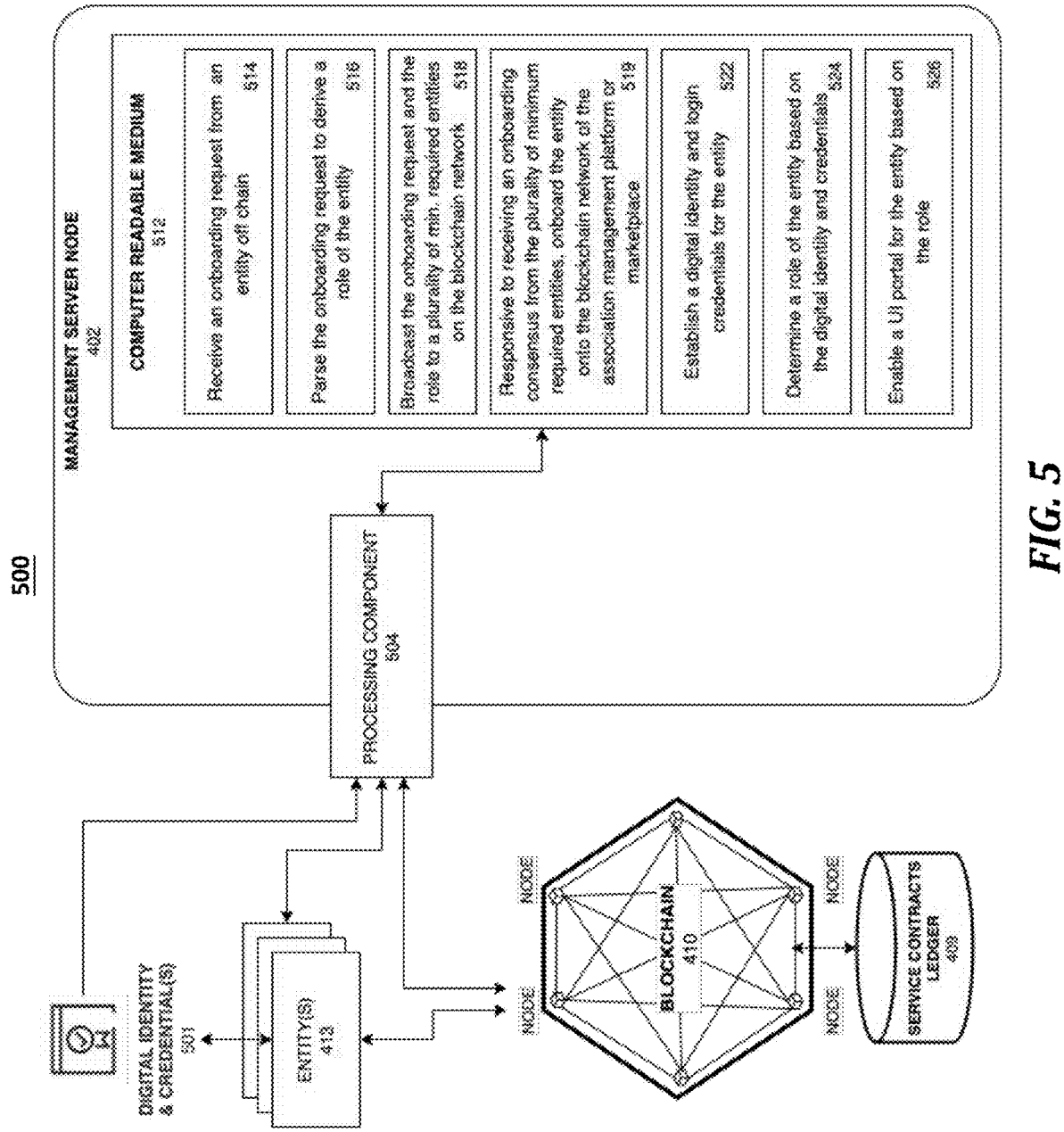
FIG. 5 illustrates a network diagram of a system for blockchain-based association management platform and marketplace including key activities of a management server node consistent with the present disclosure.

FIG. 5 illustrates a network diagram 500 of a system for a blockchain-based automated system for real-time management platform for community associations and marketplace including detailed features of a management server node consistent with the present disclosure.

Referring to FIG. 5, the example network 500 includes the management server node 402 connected to onboarded entities 413 nodes over a blockchain network. As discussed above with reference to FIG. 4, the management server node 402 may receive entities-related data from local and remote databases. As discussed above, the entity digital identity, credentials and role data may be retrieved from the ledger 409 of the blockchain 410.

This way, whenever this entity logs into the management platform and/or marketplace using its role-based credentials, the management server may analyze the role of the entity and may instantiate an API(s) to provide a corresponding UI portal to the that entity based on the role. As discussed above, the management server node 402 may query a local database 403 (see FIG. 4) for the historical local data pertaining to existing entities 413 or previous entities in order to present this information to the entities that are required to provide the consensus. For example, if a new vendor is requesting to onboard, the management server node 402 may check for other similar vendors already existing on the association management platform and/or marketplace or for the vendors who previously existed and left or were offboarded for some reason.

In one embodiment, the management server node 402 may acquire relevant remote data a remote database residing on a cloud server off chain (not shown). The remote data may be collected from other associations using the same association management platform. This way, an entity that did not have a very good track record with another association may not be allowed to be onboarded to the current association. In one embodiment, entity related transaction recorded on a blockchain of another association may be audited based on the consensus received from require entities of another association.

While this example describes in detail only one management server node 402, multiple such nodes may be connected to the network and to the blockchain 410. It should be understood that the management server node 402 may include additional components and that some of the components described herein may be removed and/or modified without departing from a scope of the management server node 402 disclosed herein. The management server node 402 may be a cloud elastic computing device or a server computer, or the like, and may include a processing component 504, which may be a semiconductor-based microprocessor, a central processing unit (CPU), an application specific integrated circuit (ASIC), a field-programmable gate array (FPGA), and/or another hardware device. Although a single processing component 504 is depicted, it should be understood that the management server node 402 may include multiple processors, multiple cores, or the like, without departing from the scope of the management server node 402 system.

The management server node 402 may also include a non-transitory computer readable medium 512 that may have stored thereon machine-readable instructions executable by the processing component 504. Examples of the machine-readable instructions are shown as 514-526 and are further discussed below. Examples of the non-transitory computer readable medium 512 may include an electronic, magnetic, optical, or other physical storage device that contains or stores executable instructions. For example, the non-transitory computer readable medium 512 may be a Random-Access memory (RAM), an Electrically Erasable Programmable Read-Only Memory (EEPROM), a hard disk, an optical disc, or type of Cache memory or CPU memory or other type of storage device.

The processing component 504 may fetch, decode, and execute the machine-readable instructions 514 to receive an onboarding request from at least one entity 413 off chain. The processing component 504 may fetch, decode, and execute the machine-readable instructions 516 to parse the onboarding request to derive a role of the at least one entity 413. The processing component 504 may fetch, decode, and execute the machine-readable instructions 518 to broadcast the onboarding request and the role to a plurality of minimum required entities 413 on the blockchain 410 network. The processing component 504 may fetch, decode, and execute the machine-readable instructions 519 to, responsive to receiving an onboarding consensus from the plurality of minimum required entities, onboard the at least one entity onto the association management platform.

The processing component 504 may fetch, decode, and execute the machine-readable instructions 522 to receive login credentials 501 from the at least one entity 413. The processing component 504 may fetch, decode, and execute the machine-readable instructions 524 to determine a role of the at least one entity 413 based on the credentials 501. The processing component 504 may fetch, decode, and execute the machine-readable instructions 526 to communicate the web server to upload a UI portal to the at least one entity 413 based on the role. The permissioned blockchain 410 may be configured to use one or more smart contracts that manage transactions for multiple participating nodes (e.g., 413 and 402) and for recording the transactions on the ledger 409.

Figure 6A:
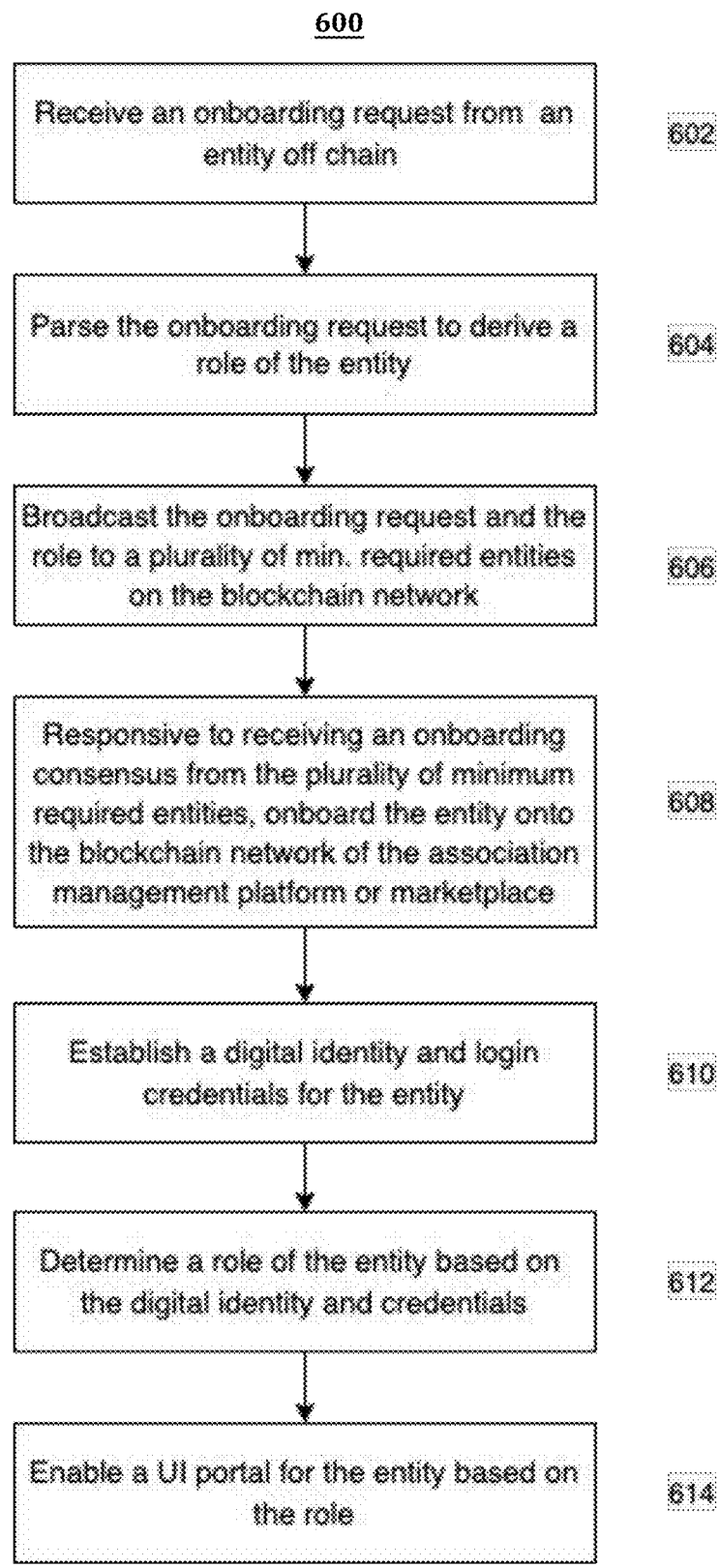
FIG. 6A illustrates a flowchart of a method for blockchain-based association management platform and marketplace consistent with the present disclosure.

FIG. 6A illustrates a flowchart of a method for a blockchain-based automated real-time management platform for community associations and/or marketplace consistent with the present disclosure.

Referring to FIG. 6A, the method 600 may include one or more of the steps described below. FIG. 6A illustrates a flow chart of an example method executed by the management server 402 (see FIG. 5). It should be understood that method 600 depicted in FIG. 6A may include additional operations and that some of the operations described therein may be removed and/or modified without departing from the scope of the method 600. The description of the method 600 is also made with reference to the features depicted in FIG. 5 for purposes of illustration. Particularly, the processing component 504 of the management server 402 may execute some or all of the operations included in the method 600.

With reference to FIG. 6A, at block 602, the processing component 504 may receive an onboarding request from at least one entity off chain. At block 604, the processing component 504 may parse the onboarding request to derive a role of the at least one entity. At block 606, the processing component 504 may broadcast the onboarding request and the role to a plurality of minimum required entities on the blockchain network. At block 608, the processing component 504 may, be responsive to receiving an onboarding consensus from the plurality of minimum required entities, onboard the at least one entity onto the association management platform. At block 610, the processing component 504 may establish the digital identity and credentials from the at least one entity. At block 612, the processing component 504 may determine a role of the at least one entity based on the credentials. At block 614, the processing component 504 may enable a UI portal to the at least one entity based on the role.

Figure 6B:
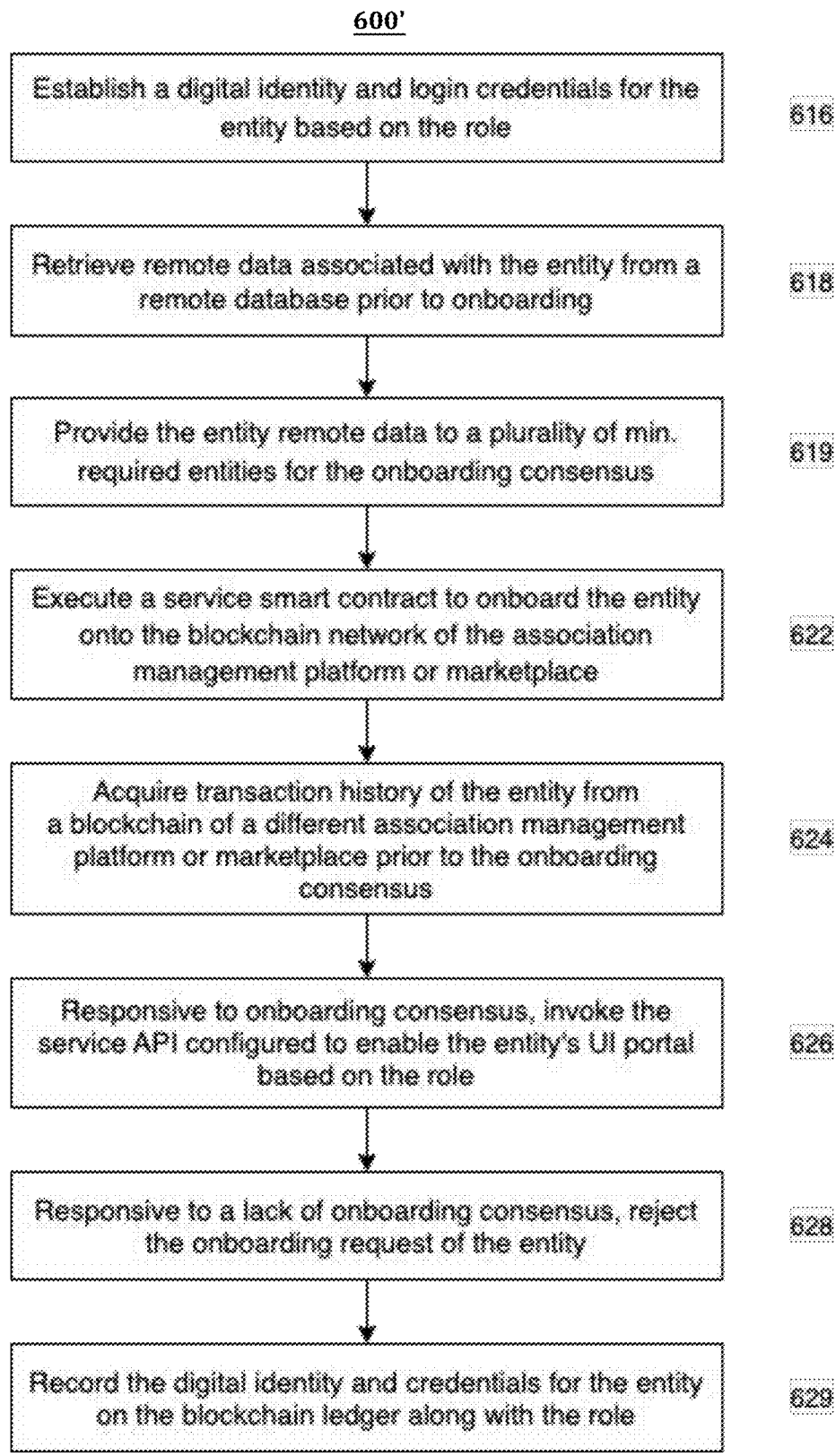
FIG. 6B illustrates a further flow chart of a method for the blockchain-based association management platform and marketplace consistent with the present disclosure.

FIG. 6B illustrates a further flowchart of a method for a blockchain-based automated real-time management platform for community associations and/or marketplace consistent with the present disclosure.

Referring to FIG. 6B, the method 600' may include one or more of the steps described below. FIG. 6B illustrates a flow chart of an example method executed by the management server 402 (see FIG. 5). It should be understood that method 600' depicted in FIG. 6B may include additional operations and that some of the operations described therein may be removed and/or modified without departing from the scope of the method 600'. The description of the method 600' is also made with reference to the features depicted in FIG. 5 for purposes of illustration. Particularly, the processing component 504 of the management server 402 may execute some or all of the operations included in the method 600'.

With reference to FIG. 6B, at block 616, the processing component 504 may establish digital identity and login credentials for the at least one entity based on the role. At block 618, the processing component 504 may retrieve remote data associated with the at least one entity from a remote database prior to onboarding. At block 619, the processing component 504 may provide the remote data to the plurality of minimum required entities for the onboarding consensus. At block 622, the processing component 504 may execute a smart contract to onboard the at least one entity onto the association management platform and/or marketplace. At block 624, the processing component 504 may acquire transactions' history of the at least one entity from a blockchain of a different association management platform or marketplace prior to the onboarding consensus. At block 626, the processing component 504 may invoke an API configured to enable the UI portal based on the role. At block 628, the processing component 504 may responsive to a lack of the onboarding consensus, reject the onboarding request of the at least one entity. At block 629, the processing component 504 may record the login credentials for the at least one entity on a blockchain ledger along with the role of the at least one entity.

As discussed above, the management platform may use a private (permissioned) blockchain such as a blockchain 410 (see FIG. 4) with a distributed storage system, which includes multiple nodes that communicate with each other. The distributed storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 113 and 102 (FIG. 4) may execute a consensus protocol to validate blockchain storage transactions, group the storage transactions into blocks, and build a hash chain over the blocks.

This process forms the ledger by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing programming parameters for efficient functioning of the traffic light, but which do not fully trust one another.

This application utilizes a permissioned (private) blockchain that operates programmable logic, tailored to a distributed storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

Figure 6C:
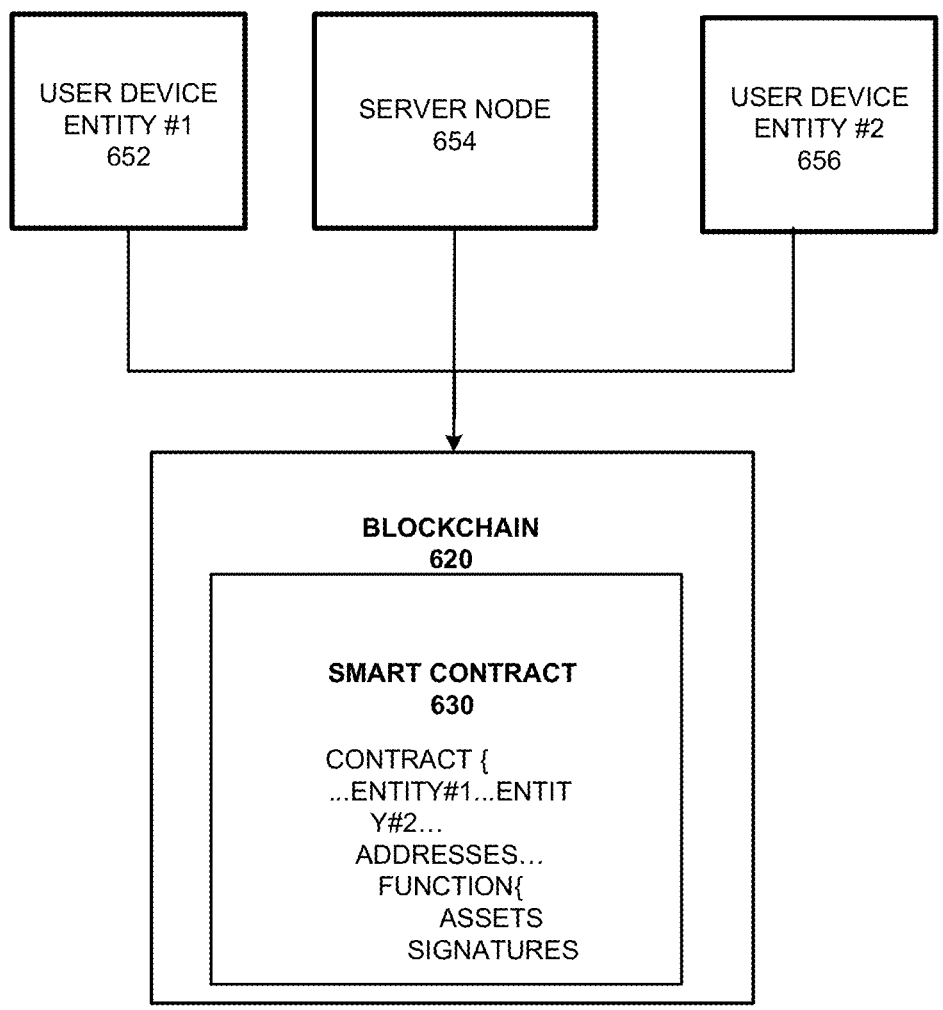
FIG. 6C illustrates a further example blockchain-based system configured to utilize a smart contract, according to an embodiment of the present disclosure.

FIG. 6C illustrates a further example blockchain-based system configured to utilize a smart contract, according to an embodiment of the present disclosure.

FIG. 6C illustrates an example system configured to utilize a smart contract configuration among contracting parties and a mediating server configured to enforce the smart contract terms on the blockchain according to example embodiments. In one embodiment, one or more nodes may be used to control approvals on smart contracts within a blockchain. Referring to FIG. 6C, the configuration 610 may represent a communication session, an asset (e.g., NFT) transfer session or a process or procedure that is driven by a smart contract 630 which explicitly identifies one or more entities 652 and/or 656. The execution, operations and results of the smart contract execution may be managed by the secure approval node (e.g., a server) 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices. In one embodiment, one or more nodes 654 may be used to control approvals on smart contracts within a blockchain.

Figure 11:
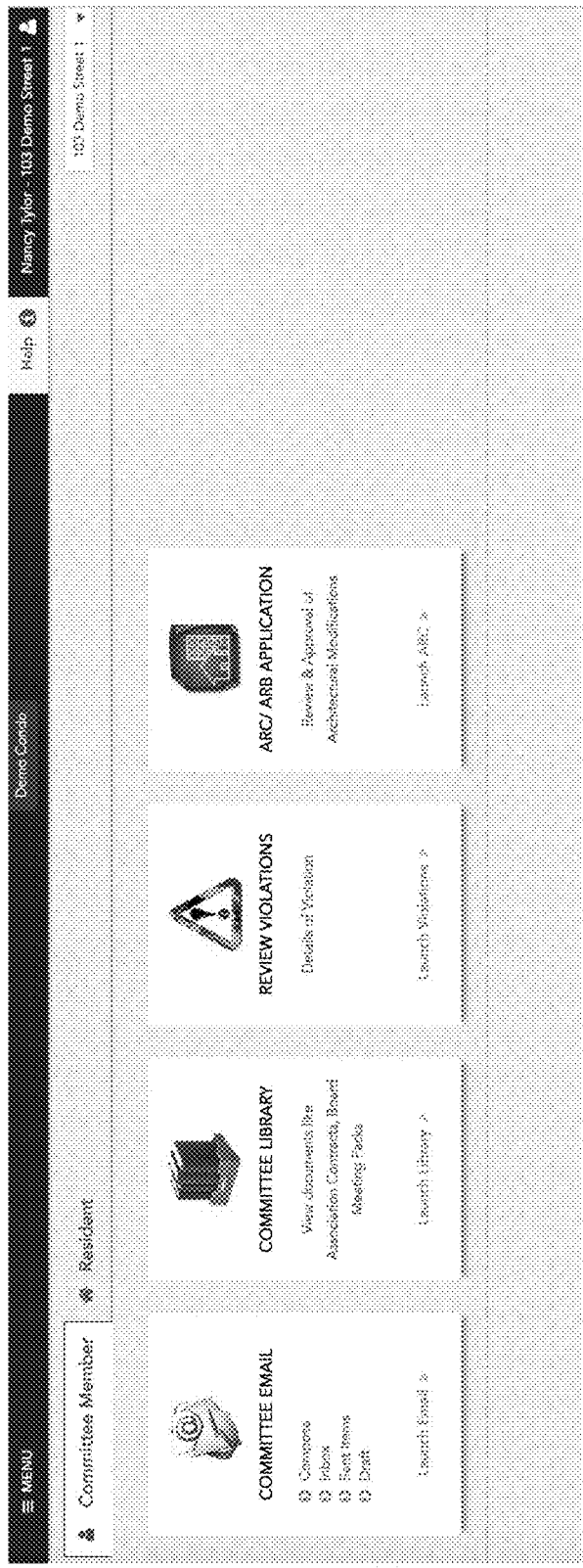
FIG. 11 illustrates a committee member portal consistent with the present disclosure.
Figure 12:
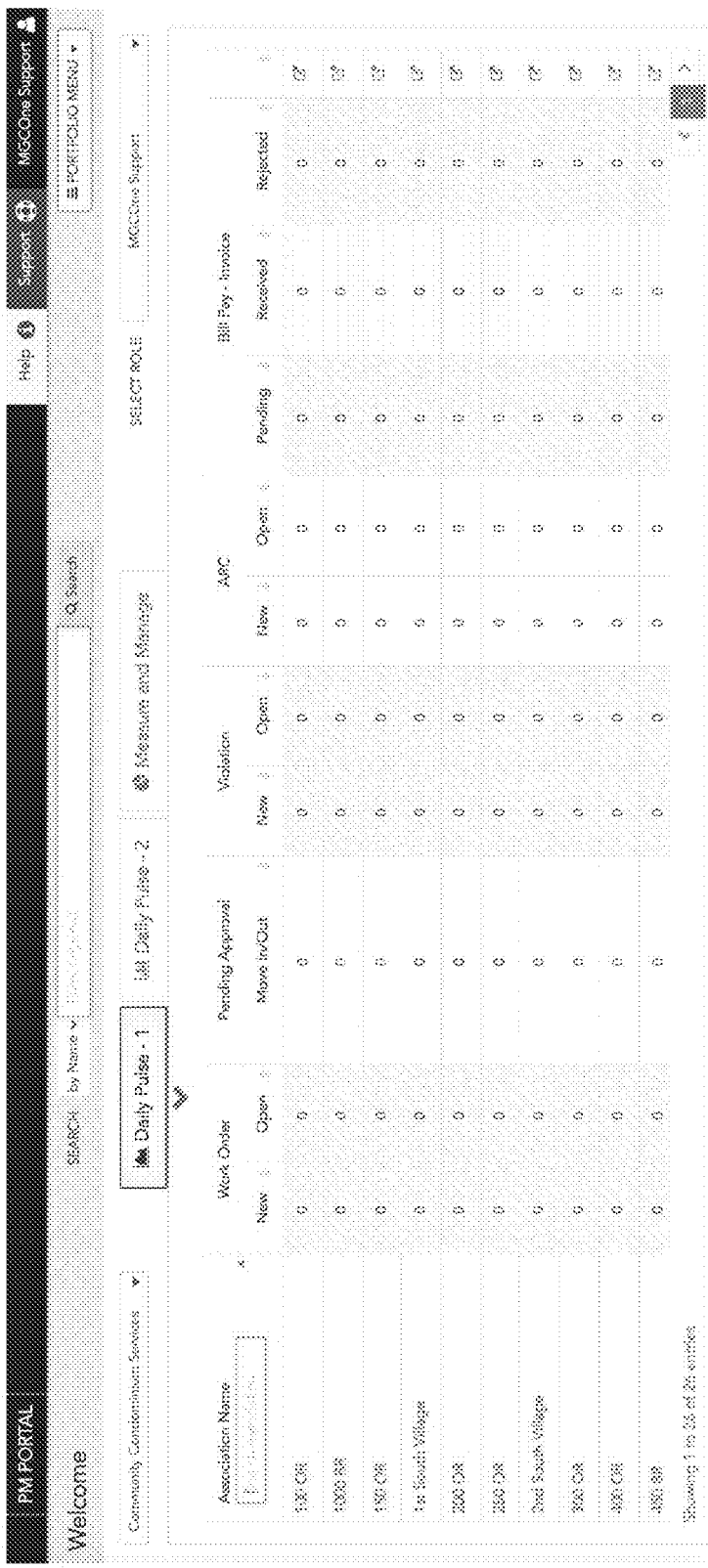
FIG. 12 illustrates a management company portal consistent with the present disclosure.
Figure 15:
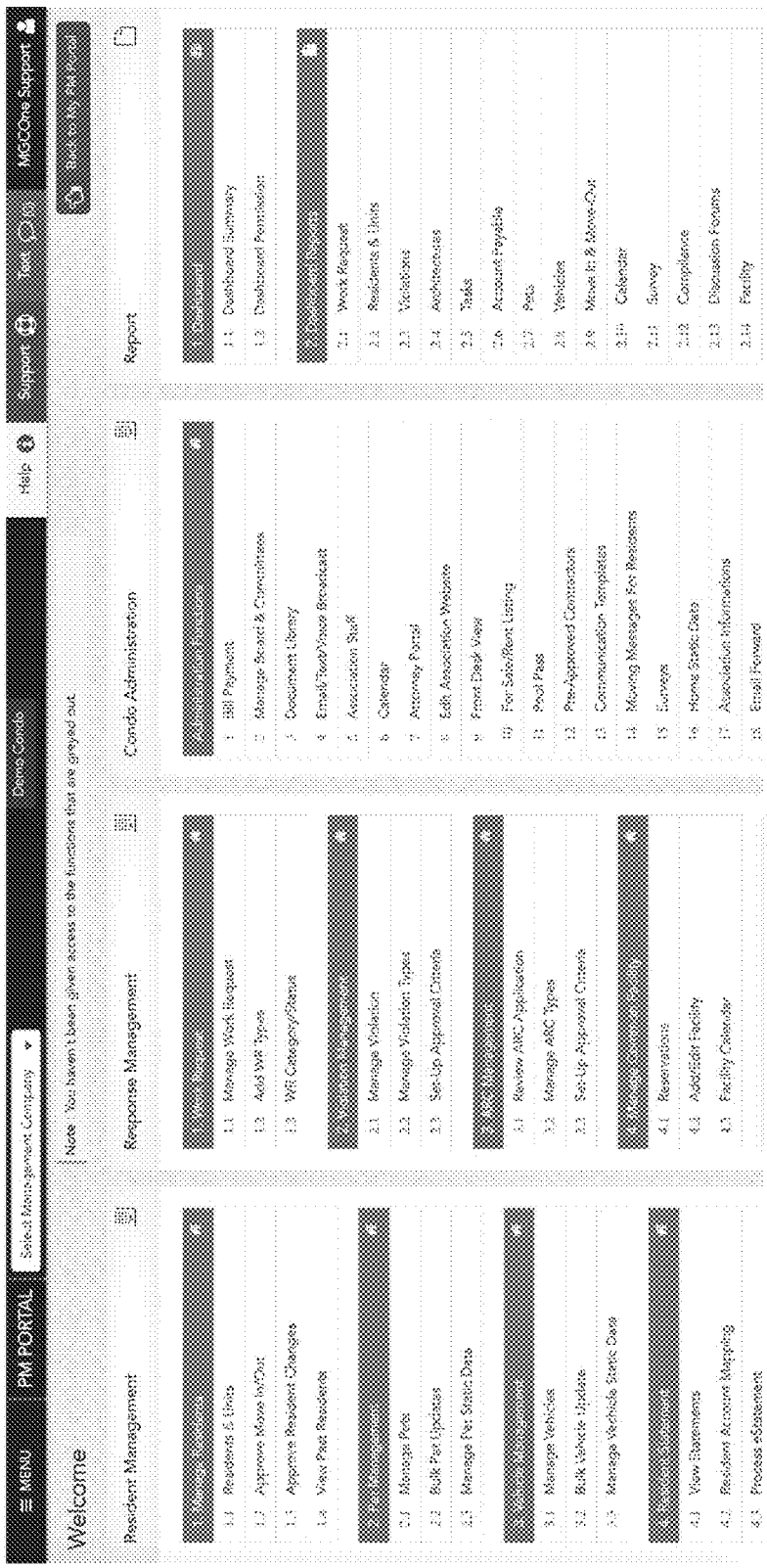
FIG. 15 illustrates a maintenance staff portal consistent with the present disclosure.
Figure 16:
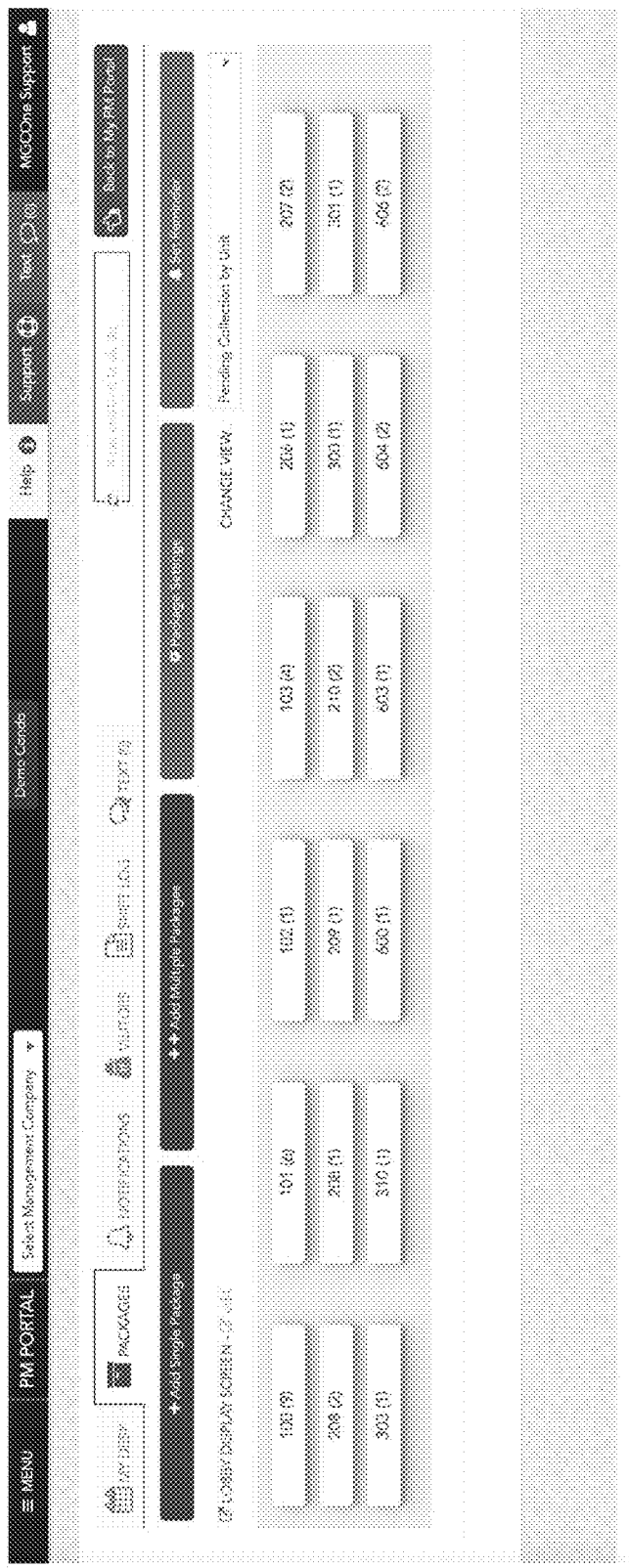
FIG. 16 illustrates a security/front desk portal consistent with the present disclosure.
Figure 17:
FIG. 17 illustrates a vendor portal consistent with the present disclosure.

FIGS. 7-19 illustrate non-limitings examples of UI portals provided by the management and web server to the requesting entities according to the disclosed embodiments. In particular, FIG. 7 illustrates a developer portal consistent with the present disclosure, FIG. 8 illustrates a marketing firm consistent with the present disclosure, FIG. 9 illustrates a resident (owner) portal consistent with the present disclosure, FIG. 10 illustrates a board member portal consistent with the present disclosure, FIG. 11 illustrates a committee member portal consistent with the present disclosure, FIG. 12 illustrates a management company portal consistent with the present disclosure, FIG. 13 illustrates a community manager portal consistent with the present disclosure, FIG. 14 illustrates an accountant portal consistent with the present disclosure, FIG. 15 illustrates a maintenance staff portal consistent with the present disclosure, FIG. 16 illustrates a security/front desk portal consistent with the present disclosure, FIG. 17 illustrates a vendor portal consistent with the present disclosure, FIG. 18 illustrates an attorney portal consistent with the present disclosure, FIG. 19 illustrates an auditor portal consistent with the present disclosure.

As discussed above, the features and/or the actions described and/or depicted herein can occur on or with respect to the blockchain 410. The above embodiments of the present disclosure may be implemented in hardware, in a computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 20 illustrates an example computing device (e.g., a server node) 500, which may represent or be integrated in any of the above-described components, etc.

Figure 20:
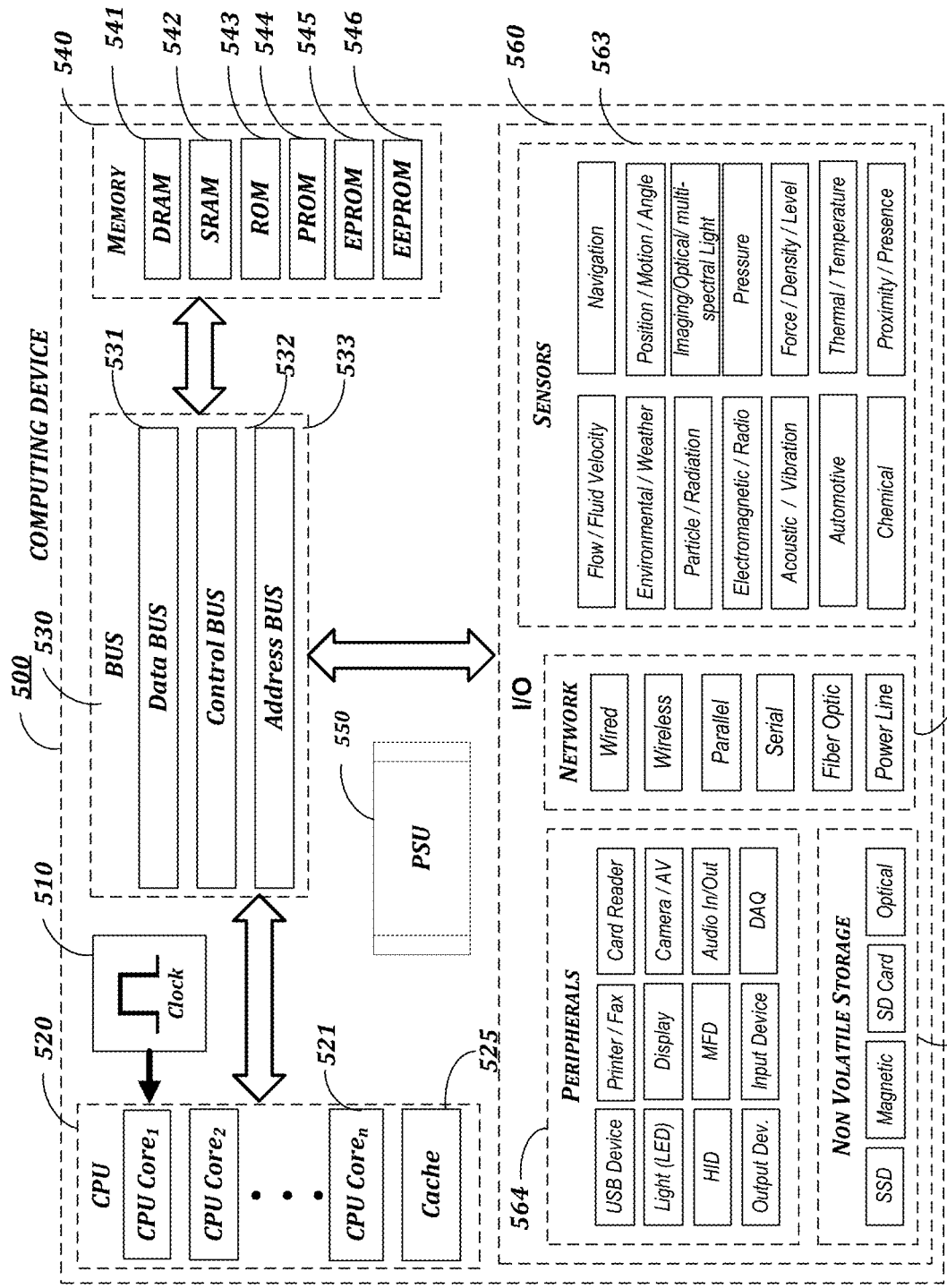
FIG. 20 illustrates a block diagram of a system including a computing device for performing the methods of FIGS. 6A and 6B.

FIG. 20 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The management server node 402 (see FIG. 4) may be hosted on a centralized server or on a cloud computing service. Although method 600 has been described to be performed by the management server node 402 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all the attached figures, including the management server node 402 (FIG. 4). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where, the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, know to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by the at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using intermediate area in the memory 550. The non-volatile storage sub-module 561 does not lose data when power is removed and may be two orders of magnitude less costly than storage used in memory module, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (*UDO*).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be said are networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:
  Wired communications, such as, but not limited to, coaxial cable, phone lines, twisted pair cables (ethernet), and InfiniBand.
  Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 5G (such as WiMax and LTE), and 5G (short and long wavelength).
  Parallel communications, such as, but not limited to, LPT ports.
  Serial communications, such as, but not limited to, RS-232 and USB.
  Fiber Optic communications, such as, but not limited to, Single-mode optical fiber (SMF) and Multi-mode optical fiber (MMF).
  Power Line and wireless communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.
  Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices uses to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software.

Aside from recording, audio input devices are also used with speech recognition software. Examples of types of audio input devices include, but not limited to microphone, Musical Instrumental Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system, comprising:
    a processing component of a management server node connected to a plurality of entities over a permissioned blockchain network of an association management platform;
    a memory component on which are stored machine language that when executed by the processing component, cause the processing component to:
    receive, via an off-chain communication interface, an onboarding request from at least one entity off chain;
    parse the onboarding request to derive a proposed role of the at least one entity;
    broadcast the onboarding request and the proposed role to a plurality of minimum required entities using a smart contract protocol on the permissioned blockchain network;
    receive a consensus response from the plurality of minimum required entities verifying the onboarding request;
    responsive to receiving an onboarding consensus from the plurality of minimum required entities, onboard the at least one entity onto the association management platform by cryptographically recording, as a validated block entry, the entity's onboarding event and identity in the distributed ledger;
    establish a digital identity and credentials for the entity, wherein the identity and credentials are recorded on the blockchain ledger and cross-referenced with role-specific metadata;
    determine a role of the at least one entity based on the digital identity and credentials, including role authority and scope derived from the verified consensus; and
    instantiate, based on a confirmed role, an application programming interface to provide access to a corresponding secure, role-specific user interface (UI) portal for the at least one entity.

2. The system of claim 1, wherein the machine language further cause the processing component to generate a digital identity and login credentials for the at least one entity based on the role.

3. The system of claim 1, wherein the machine language further cause the processing component to retrieve remote data associated with the at least one entity from a remote database prior to onboarding.

4. The system of claim 3, wherein the machine language further causes the processing component to provide the remote data to the plurality of minimum required entities for the onboarding consensus.

5. The system of claim 1, wherein the machine language further causes the processing component to execute a smart contract to onboard the at least one entity onto the association management platform.

6. The system of claim 1, wherein the machine language further causes the processing component to acquire a transaction history of the at least one entity from a different association management platform prior to the onboarding consensus.

7. The system of claim 2, wherein the machine language further causes the processing component to record the digital identity and credentials for the at least one entity on the blockchain network along with the role of the at least one entity.

8. A method for an association management platform comprising machine language techniques, the techniques comprising:
    receiving, by a management server via an off-chain communication interface, an onboarding request from at least one entity off a blockchain network;
    parsing, by the management server, the onboarding request to derive a role of the at least one entity;
    broadcasting, by the management server, the onboarding request and the role to a plurality of minimum required entities using a smart contract protocol on the permissioned blockchain network;
    receiving a consensus response from the plurality of minimum required entities verifying the onboarding request;

responsive to receiving an onboarding consensus from the plurality of minimum required entities, onboarding, by the management server, the at least one entity onto the association management platform by cryptographically recording, as a validated block entry, the entity's onboarding event and identity in the distributed ledger;

establish a digital identity and credentials for the entity, wherein the identity and credentials are recorded on the blockchain ledger and cross-referenced with role-specific metadata;

receiving, by the management server, digital identity, and login credentials from the at least one entity;

determining, by the management server, a role of the at least one entity based on the credentials; and instantiating, based on a confirmed role, an application programming interface to provide access to a corresponding secure, role-specific user interface (UI) portal for the at least one entity based on the role.

9. The method of claim 8, further comprising generating and establishing a digital identity and login credentials for the at least one entity based on the role.

10. The method of claim 8, further comprising retrieving remote data associated with the at least one entity from a remote database prior to onboarding.

11. The method of claim 10, further comprising providing the remote data to the plurality of minimum required entities for the onboarding consensus.

12. The method of claim 8, further comprising executing a smart contract to onboard the at least one entity onto the association management platform.

13. The method of claim 8, further comprising acquiring a transaction history of the at least one entity from a different association management platform prior to the onboarding consensus.

14. A non-transitory computer readable medium comprising instructions, that when executed by a processing component, cause the processing component to perform operations for an association management platform, comprising:

receiving, via an off-chain communication interface, an onboarding request from at least one entity off chain;

parsing the onboarding request to derive a role of the at least one entity;

broadcasting the onboarding request and the role to a plurality of minimum required entities using a smart contract protocol on the permissioned blockchain network;

receiving a consensus response from the plurality of minimum required entities verifying the onboarding request;

responsive to receiving an onboarding consensus from the plurality of minimum required entities, onboarding the at least one entity onto the association management platform by cryptographically recording, as a validated block entry, the entity's onboarding event and identity in the distributed ledger;

establishing a digital identity and login credentials from the at least one entity, wherein the identity and credentials are recorded on the blockchain ledger and cross-referenced with role- specific metadata;

determining a role of the at least one entity based on the credentials, including role authority and scope derived from the verified consensus; and instantiating, based on a confirmed role, an application programming interface to provide access to a corresponding secure, role-specific user interface (UI) portal for the at least one entity based on the role.

15. The non-transitory computer readable medium of claim 14, further comprising instructions, that when read by the processing component, cause the processing component to generate and establish a digital identity and login credentials for the at least one entity based on the role.

16. The non-transitory computer readable medium of claim 14, further comprising instructions, that when read by the processing component, cause the processing component to retrieve remote data associated with the at least one entity from a remote database prior to onboarding and to provide the remote data to the plurality of minimum required entities for the onboarding consensus.

* * * * *